(12) United States Patent
Takemura et al.

(10) Patent No.: US 8,630,793 B2
(45) Date of Patent: Jan. 14, 2014

(54) VEHICLE CONTROLLER

(75) Inventors: Masayuki Takemura, Hitachi (JP); Shoji Muramatsu, Hitachinaka (JP); Isao Furusawa, Hitachinaka (JP); Shinya Ohtsuji, Tokai (JP); Takeshi Shima, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/395,327

(22) PCT Filed: Aug. 6, 2010

(86) PCT No.: PCT/JP2010/063353
§ 371 (c)(1),
(2), (4) Date: May 3, 2012

(87) PCT Pub. No.: WO2011/040119
PCT Pub. Date: Apr. 7, 2011

(65) Prior Publication Data
US 2012/0215377 A1 Aug. 23, 2012

(30) Foreign Application Priority Data
Sep. 30, 2009 (JP) .................................. 2009-225887

(51) Int. Cl.
*G06F 17/10* (2006.01)

(52) U.S. Cl.
USPC ............................................. 701/301; 701/1

(58) Field of Classification Search
USPC ............................................. 701/1, 300–301
See application file for complete search history.

(56) References Cited

U.S. PATENT DOCUMENTS

| 6,813,370 | B1 | 11/2004 | Arai | |
|---|---|---|---|---|
| 2002/0042668 | A1* | 4/2002 | Shirato et al. ..................... | 701/1 |
| 2002/0131620 | A1* | 9/2002 | Shirato ........................ | 382/104 |
| 2010/0231718 | A1* | 9/2010 | Nakamori et al. ............ | 348/148 |
| 2011/0187515 | A1* | 8/2011 | Saito et al. ................. | 340/425.5 |

FOREIGN PATENT DOCUMENTS

| JP | 5-314396 A | 11/1993 |
|---|---|---|
| JP | 11-70884 A | 3/1999 |
| JP | 2001-199295 A | 7/2001 |
| JP | 2005-165915 A | 6/2005 |
| JP | 2006-178675 A | 7/2006 |
| JP | 2009-121845 A | 6/2009 |

OTHER PUBLICATIONS

International Search Report with English translation dated Nov. 9, 2010 (four (4) pages).
German Office Action with English translation dated Jun. 21, 2013 (twelve (12) pages).

* cited by examiner

*Primary Examiner* — Hussein A. Elchanti
(74) *Attorney, Agent, or Firm* — Crowell & Moring LLP

(57) ABSTRACT

A vehicle controller is provided capable of expanding an application range of departure prevention control while suppressing erroneous control. The vehicle controller includes: a vehicle-mounted camera 600 that captures an image in front of a vehicle; and an ECU 610 that decides one vehicle control method from a plurality of vehicle control methods and controls an actuator with the decided vehicle control method. The vehicle-mounted camera includes an area-specific confidence calculation section 400 that divides the image captured into a plurality of areas on a basis of an acquired image by the capturing and a recognized lane, calculates confidence for each divided area and outputs area-specific confidence information, and the ECU decides a vehicle control method in accordance with the area-specific confidence information.

6 Claims, 20 Drawing Sheets

FIG. 4
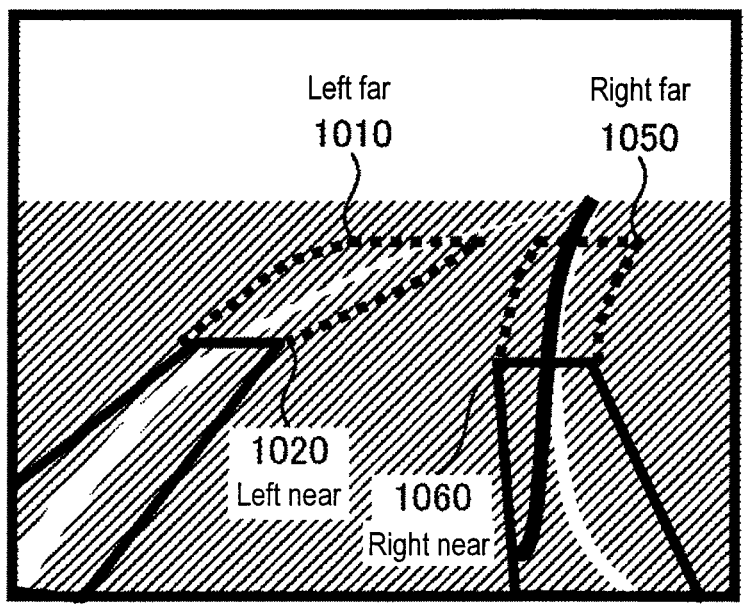
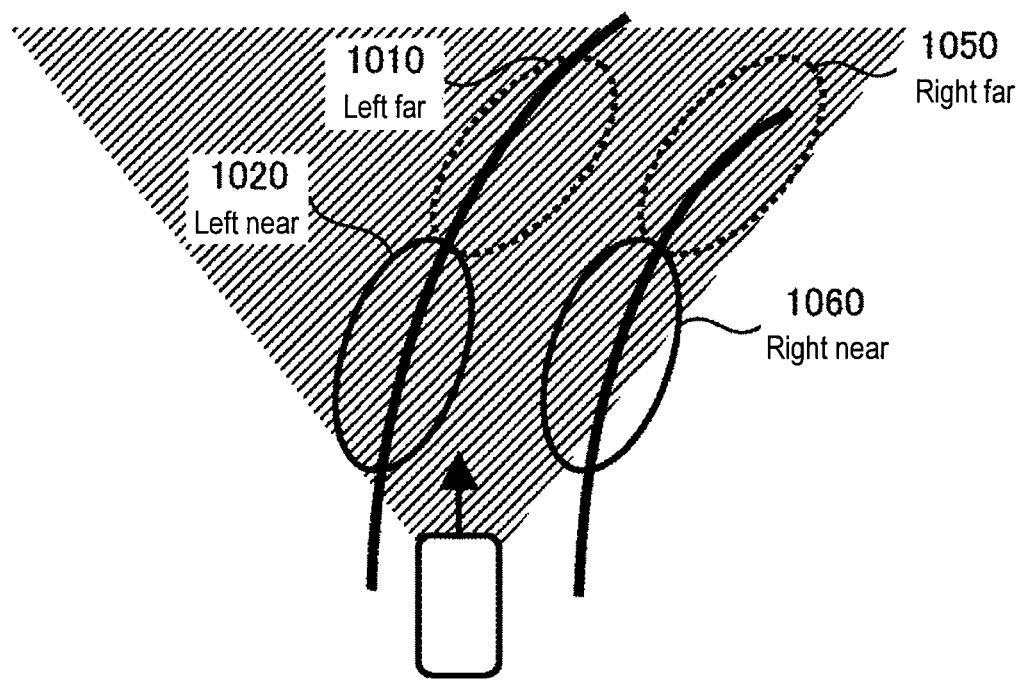

FIG. 7

|  | Far area | Near area |
|---|---|---|
| Curve control mode | ○ Far first predetermined value or more | ○ Near first predetermined value or more |
| Straight control mode | ✕ Less than far first predetermined value | ○ Near first predetermined value or more |
| Warning mode | ✕ Less than far first predetermined value | △ Less than near first predetermined value and near second predetermined value or more |
| Stop mode | ✕ Less than far first predetermined value | ✕ Less than near second predetermined value |

FIG. 8
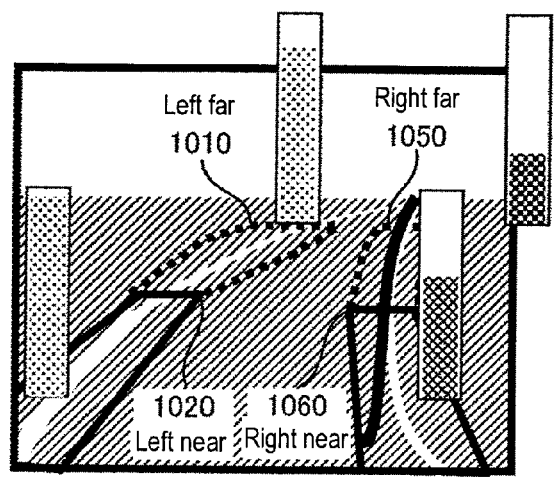
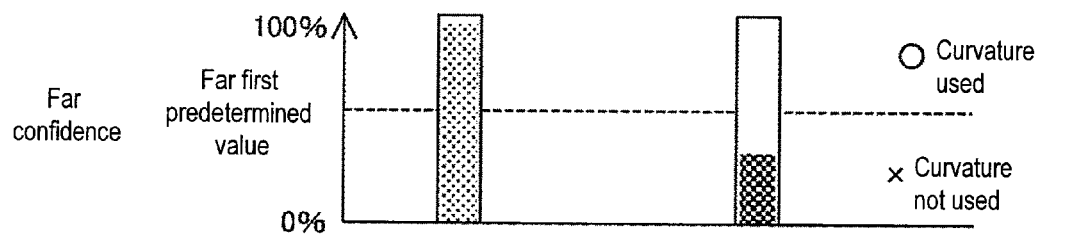
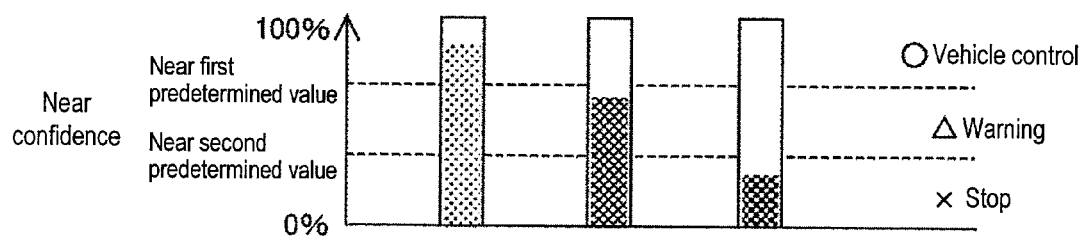

FIG. 9
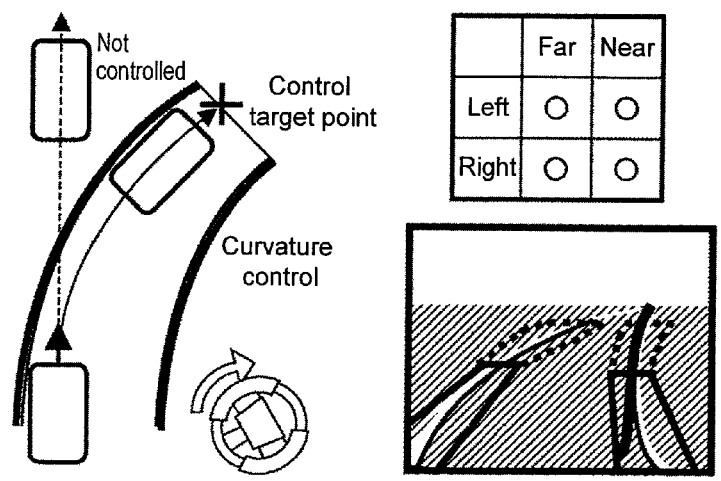
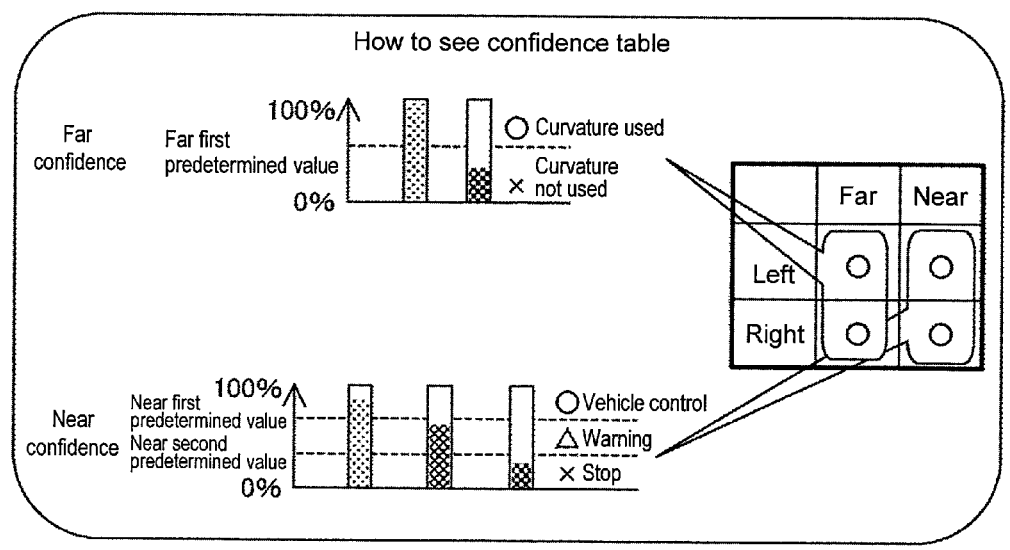

$$\rho = \left(1 - \frac{m}{2l^2} \frac{l_f C_f - l_r C_r}{C_f C_r} V^2\right) \frac{l}{\delta_0}$$

$\rho$ : Circling radius
$l_f, l_r$ : Barycenter to front (rear) wheel distance
$C_f(C_r)$ : Tire cornering power of front (rear) wheel
$\delta_0$ : Forward wheel rudder angle $m$ : Vehicle weight
$l = l_f + l_r$ : Front to rear wheel distance
$V$ : Vehicle speed Control mode : Curve control mode Curve control mode
(All turned on)

Straight control mode
(Upper 1 turned off,
Lower 2 turned on)

Warning mode
(Upper 2 turned off,
Lower 1 turned on)

Stop mode
(All turned off)

VEHICLE CONTROLLER

TECHNICAL FIELD

The present invention relates to vehicle controllers to control lane departure of vehicles.

BACKGROUND ART

Lane mark recognition devices are available, including a camera and a radar mounted on a vehicle to recognize lane marks, thus estimating a relative positional relationship between the vehicle and a lane and the curvature indicating the degree of curve of a road. In order to prevent accidents such as lane departure based on this curvature as well as a yaw angle and a lateral position, vehicle controllers are available, performing control such as lane departure alarm and lane departure prevention. According to conventional techniques, a lane departure prevention controller calculates confidence for the overall lane mark recognition result and switches a lane departure control method based on this result on confidence (see Patent Document 1).

Patent Document 1: JP Patent Publication (Kokai) No. 2006-178675 A

DISCLOSURE OF THE INVENTION

Problem to be Solved by the Invention

In some cases drivers have difficulty seeing road markers (Bott's dots), faint white lines on a white road surface (concrete) and the like only in the distance. In the other cases drivers may have difficulty seeing only one of the left and right sides depending on the direction of the Sun, lane marks worn on only one side or such Bott's dots.

In the conventional technique described above, confidence is calculated for the overall lane mark recognition result, and therefore a partially hard-to-see area degrades the overall confidence and so unfortunately degrades the availability ratio of departure prevention control.

It is an object of the invention to provide a lane departure prevention controller capable of expanding an application range of departure prevention control while suppressing erroneous control.

Means for Solving the Problem

In order to fulfill the aforementioned object, a vehicle controller of the present invention includes: a vehicle-mounted camera that captures an image in front of a vehicle; and a processing unit that decides one vehicle control method from a plurality of vehicle control methods and controls an actuator with the decided vehicle control method. The vehicle-mounted camera includes an area-specific confidence calculation section that divides the image captured into a plurality of areas on a basis of an acquired image by the capturing and a recognized lane, calculates confidence for each divided area and outputs area-specific confidence information, and the processing unit includes a vehicle control section that decides a vehicle control method in accordance with the area-specific confidence information.

The vehicle controller further may include: a vehicle speed sensor that detects vehicle speed information; a steering angle sensor that detects steering angle information; and a yaw rate sensor that detects yaw rate information. The vehicle-mounted camera includes: an image acquisition section that acquires an image in front of the vehicle; a lane recognition section that recognizes a lane from the acquired image; a control parameter estimation section that estimates road curvature indicating a degree of curve of a road, a yaw angle indicating relative orientation between the vehicle and a driving lane and a lateral position indicating a relative position therebetween; and the area-specific confidence calculation section that divides the image acquired into a plurality of areas on a basis of the acquired image and the recognized lane, calculates confidence for each divided area and outputs area-specific confidence information, and the vehicle control section of the processing unit may decide a vehicle control method in accordance with at least one of the road curvature, the yaw angle and the lateral position as well as the area-specific confidence information.

Effects of the Invention

The present invention can provide a vehicle controller capable of expanding an application range of departure prevention control while suppressing erroneous control. The present specification includes the contents described in the specification and/or the drawings of Japanese Patent Application No. 2009-225887 that is a basis of the priority claimed by the present application.

BRIEF DESCRIPTION OF THE DRAWINGS

FIG. 4 describes the case where an area is divided into left and right and far and near in the present invention.

FIG. 7 describes a correspondence table for vehicle control modes in each area in the present invention.

FIG. 8 describes a threshold for switching vehicle control modes in the present invention.

FIG. 9 describes conditions of area-specific confidence when control is performed using curvature and the outline of the control.

DESCRIPTION OF REFERENCE NUMBERS

Figure 1:
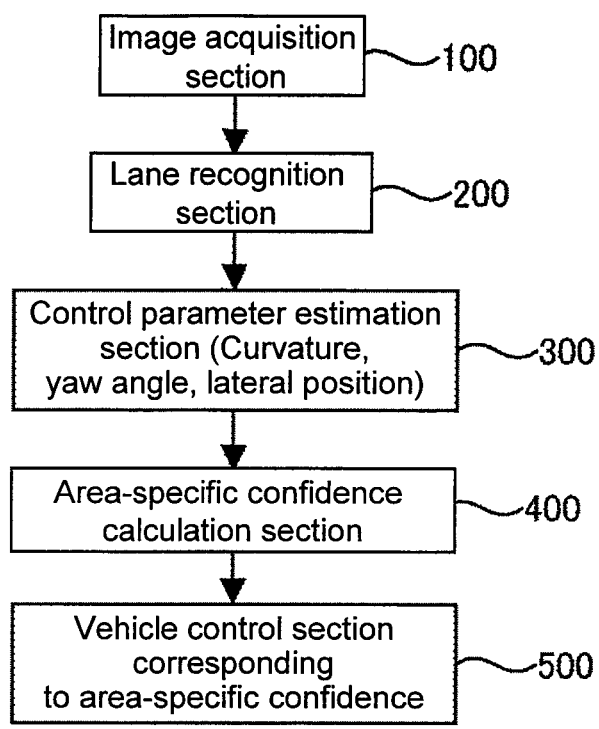
FIG. 1 shows an exemplary configuration of a vehicle controller according to the present invention.

100 Image acquisition section
200 Lane recognition section
300 Control parameter estimation section
400, 420 Area-specific confidence calculation section
410 Area determination section
430 Area-specific confidence correction section
450 External information section
451 Vehicle behavior section
452 Radar section
453 Navigation-information section
454 Other camera section
500 Vehicle control section
510 Lane-to-lane control decision
520 Curvature use determination
530 Warning determination
540 Curve control mode
550 Straight control mode
560 Warning mode
570 Stop mode
600 Vehicle-mounted camera
601 Steering angle sensor
603 Actuator
606 Vehicle speed sensor
607 Yaw rate sensor
609 Display
610 ECU
1010 Left far
1020 Left near
1050 Right far
1060 Right near

BEST MODE FOR CARRYING OUT THE INVENTION

The present invention can provide a vehicle controller including a vehicle-mounted camera 600 to capture an image in front of a vehicle and an ECU 610 as a processing unit to decide one of a plurality of vehicle control methods and control an actuator by the decided vehicle control method. The vehicle-mounted camera 600 includes an area-specific confidence calculation section 400 to divide the image into a plurality of areas on the basis of an acquired image by the capturing and a recognized lane, calculate confidence for each divided area and output area-specific confidence information. The ECU 610 includes a vehicle control section 500 to decide a vehicle control method on the basis of the area-specific confidence information. With this configuration, the vehicle controller of the present invention can expand an application range of departure prevention control while suppressing erroneous control.

The following describes embodiments of the present invention, with reference to the drawings.

<Configuration of Lane Departure Prevention Controller>

Figure 19:
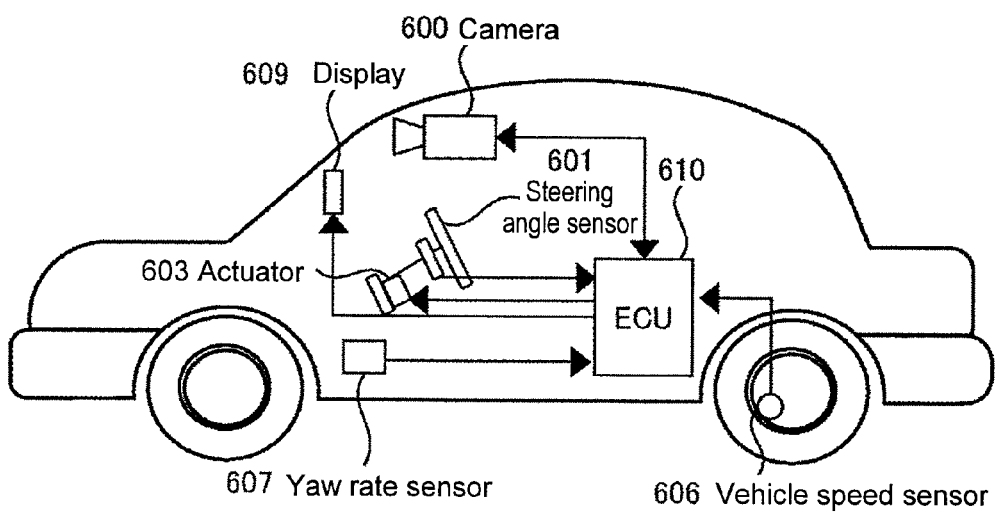
FIG. 19 illustrates an exemplary configuration of a vehicle with a lane departure prevention controller according to the present invention mounted thereon.

Referring to FIG. 19, the configuration of a vehicle with a vehicle controller mounted thereon is described below.

As illustrated in FIG. 19, the vehicle includes the vehicle-mounted camera 600 directed forward of the vehicle, where the vehicle-mounted camera 600 and the ECU (Engine Control Unit) 610 in charge of vehicle control are connected via a CAN (Controller Area Network). The vehicle is provided with a vehicle controller including the ECU 610; various sensors (a vehicle speed sensor 606, a steering angle sensor 601 and a yaw rate sensor 607) and an actuator 603. The ECU 610 acquires information such as a vehicle speed, a steering angle and a yaw rate from the sensors in the vehicle via a CAN communication. The ECU 610 decides a vehicle control method on the basis of area-specific confidence information calculated by these sensors and the camera via the CAN communication. The ECU 610 uses the actuator 603 in accordance with the vehicle control method decided to control the vehicle. The vehicle is further provided with a display 609 to display such area-specific confidence and a result of a current vehicle control mode.

As illustrated in FIG. 1, the vehicle-mounted camera 600 has the functions of an image acquisition section 100, a lane recognition section 200, a control parameter estimation section 300 and an area-specific confidence calculation section 400. Since vehicle control is performed by the ECU 610, the vehicle-mounted camera 600 is provided with a vehicle control section corresponding to area-specific confidence 500. The lane recognition section 200, the control parameter estimation section 300 and the area-specific confidence calculation section 400 may be the functions of the ECU 610.

FIG. 1 shows the configuration of a lane departure prevention controller having area-specific confidence of a lane recognition result. Referring to FIG. 1, the elements of the vehicle-mounted camera 600 are described below.

The vehicle controller includes the image acquisition section 100 to acquire an image from the vehicle-mounted camera 600; the lane recognition section 200 to recognize a lane using the acquired image; the control parameter estimation section 300 to estimate parameters used for vehicle control such as road curvature indicating the degree of curve of a road, a yaw angle indicating a relative orientation relationship between the vehicle and a driving lane and a lateral position indicating a relative positional relationship therebetween; the area-specific confidence calculation section 400 to calculate confidence of the lane recognition result for each area; and the vehicle control section corresponding to area-specific confidence 500 to perform lane departure prevention control on the basis of the area-specific confidence and the control parameter estimation result.

Herein, the confidence refers to an index indicating whether or not the lane recognition result can recognize a driving lane correctly without erroneous detection and whether or not vehicle control or warning is to be performed on the basis of the lane recognition result. The confidence is numerically represented in accordance with the characteristics amount of white lines linearly aligned in an image and the parallelism of the extracted lines, for example.

Higher confidence indicates a more correct recognition result, and lower confidence indicates erroneous detection or low recognition accuracy that is not suitable for vehicle control and warning.

Although the present embodiment describes an example where the vehicle-mounted camera 600 is a vehicle-mounted monocular camera directed to the traveling direction of the vehicle, the camera may be a stereo camera or a plurality of cameras to capture an image surrounding the vehicle. A sensor part to recognize a lane may be a sensor other than a camera, such as a laser radar or a millimeter-wave radar.

Figure 2:
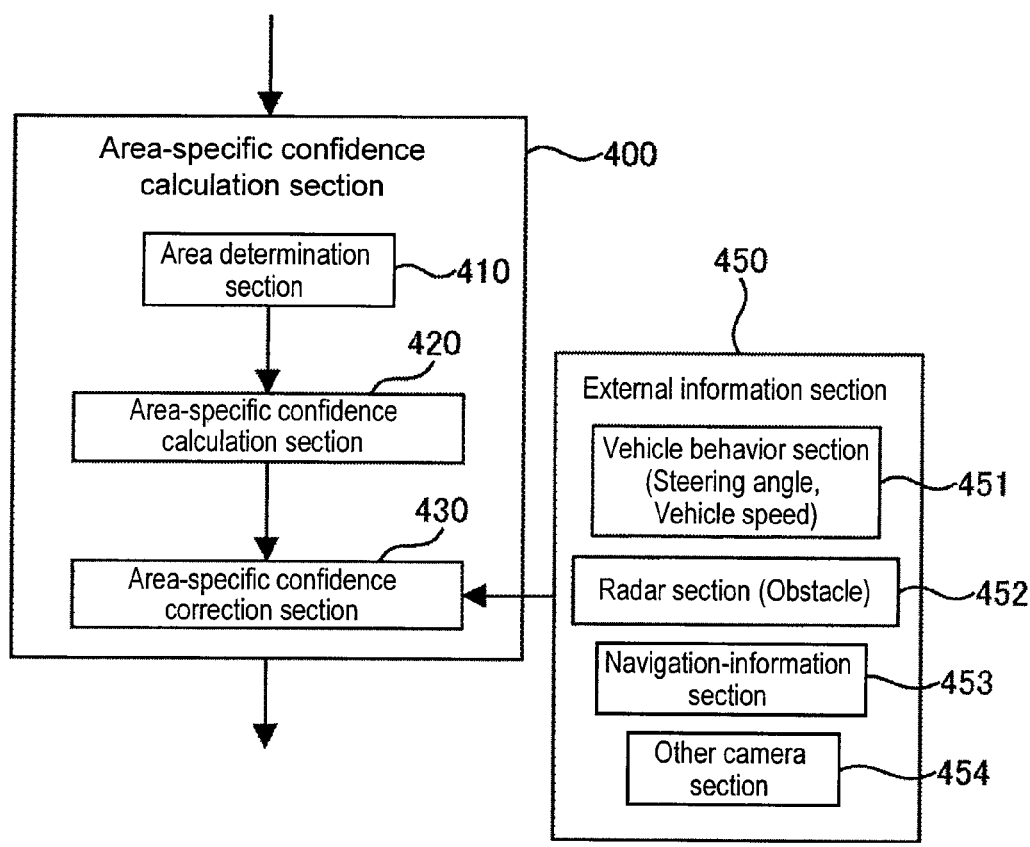
FIG. 2 shows an exemplary configuration of an area-specific confidence calculation section of the vehicle controller of FIG. 1.

Referring next to FIG. 2, the configuration of the area-specific confidence calculation section 400 is described below.

The area-specific confidence calculation section 400 includes an area determination section 410 to divide an area on the basis of a lane recognition result. In the present embodiment, the area-division is performed firstly into left and right lanes of the driving lane and then further into two areas of far and near depending on the distance, i.e., into four areas in total including left far 1010, left near 1020, right far 1050 and right near 1060.

The area-specific confidence calculation section 400 further includes an area-specific confidence calculation section 420 to calculate confidence for each area divided by the area determination section 410 on the basis of the image information captured. The area-specific confidence calculation section 400 further includes an area-specific confidence correction section 430 to correct the area-specific confidence obtained based on the image information by the area-specific confidence calculation section 420 using an external information section 450. The external information section 450 includes a vehicle behavior section 451 to deal with traveling information on the vehicle from a vehicle-speed sensor, an acceleration sensor, a steering angle sensor, a yaw rate sensor and the like to analyze the behavior of the vehicle and a radar section 452 including a millimeter-wave radar, a laser radar or a stereo camera capable of detecting an obstacle or a leading vehicle.

The external information section 450 further includes a navigation-information section 453 capable of analyzing traveling on the basis of map information from a car navigation system and a vehicle location using a GPS, a angular velocity sensor (gyro-sensor), an acceleration sensor or an orientation sensor incorporated in the navigation system. The external information section 450 further includes an other camera section 454 to use information from other cameras other than the camera to calculate the area-specific confidence.

Figure 24:
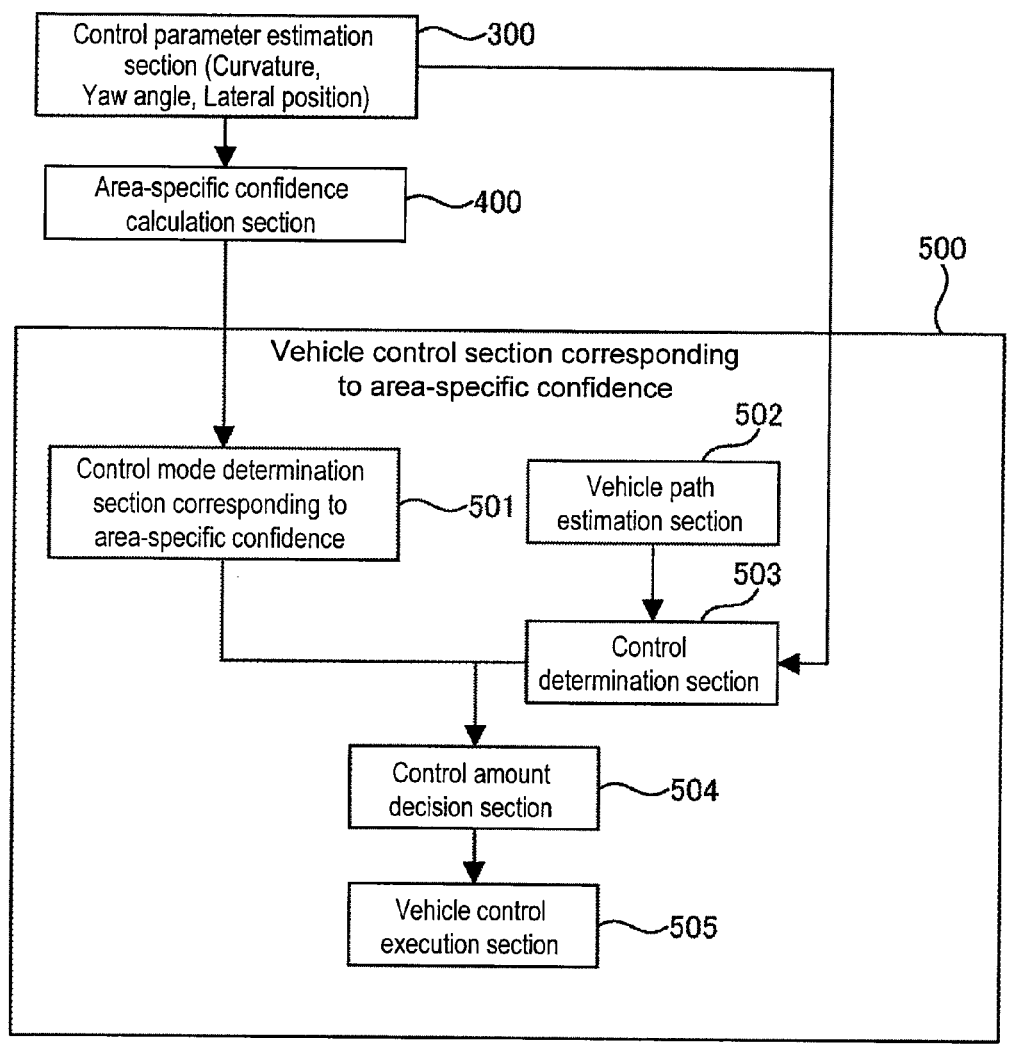
FIG. 24 illustrates a vehicle controller in accordance with area-specific confidence of the present invention.

Referring to FIG. 24, vehicle control processing in the vehicle control section corresponding to area-specific confidence 500 is described below. The vehicle control section corresponding to area-specific confidence 500 performs vehicle control in accordance with the area-specific confidence. FIG. 24 is a detailed functional block of the vehicle control section corresponding to area-specific confidence 500.

A control mode determination section corresponding to area-specific confidence 501 performs mode switching of vehicle control using a result of area-specific confidence. A vehicle path estimation section 502 estimates a path of the vehicle using vehicle-speed information and rudder-angle information when the vehicle travels as it is without receiving lane departure prevention control and driver's interaction. Comparing the estimated result of the path of the vehicle and the result of lane recognition estimated by the control parameter estimation section 300, a control determination section 503 determines whether the vehicle has the possibility of lane departure or not.

When there is no possibility for lane departure, a control amount decision section 504 selects the control amount of 0, and a vehicle control execution section 505 does not perform control and becomes a stand-by state for departure prevention control while monitoring the possibility of departure.

When there is possibility for lane departure, the control amount decision section 504 decides a control amount to be given to a rudder angle on the basis of a difference in lateral position between an estimated path and the recognized lane at L[m] ahead of the vehicle. The vehicle control execution section 505 uses the decided control amount to execute vehicle control to prevent lane departure.

The vehicle control section corresponding to area-specific confidence 500 switches a control mode in accordance with the area-specific confidence, thus performing vehicle control. The following describes the switching of control modes in accordance with the area-specific confidence by the control mode determination section corresponding to area-specific confidence 501, with reference to the drawings.

Figure 3:
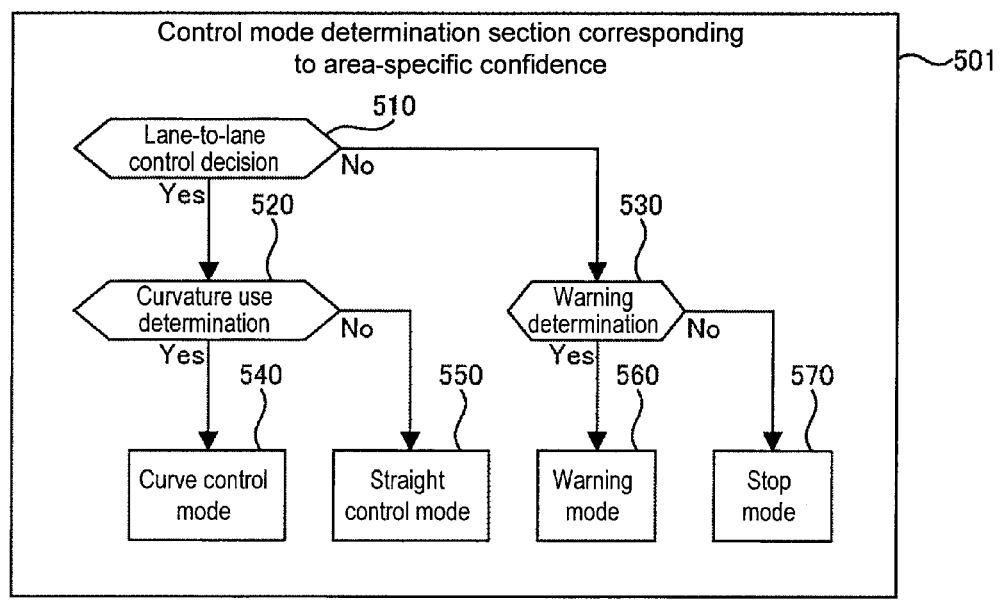
FIG. 3 is a flowchart for determination of a control mode for a vehicle by the vehicle controller of FIG. 1.

As illustrated in FIG. 4, in the present embodiment, an area to be subjected to confidence calculation is divided into four areas in total including left far 1010, left near 1020, right far 1050 and right near 1060. FIG. 3 shows a vehicle control method for a left lane in accordance with the area-specific confidence using the left far 1010 and the left near 1020 among them. Since control is performed independently to the left and right lanes in the present embodiment, vehicle control in accordance with the area-specific confidence for the right far 1050 and the right near 1060 is similar to that for the left lane, and therefore the description thereof is omitted.

At lane-to-lane control decision 510, whether or not to perform control to left and right nearest lanes of the vehicle is determined for each of the left and right sides. The following exemplifies the case of determining whether or not to perform control to the left lane of the vehicle driving lane based on the confidence of the left lane. Such a determination independent for each of the left and right lanes on whether or not to perform control enables, if detection with high confidence can be made for even one of the left and right lanes, vehicle control for a lane with such high confidence, and therefore the application range of vehicle control can be expanded. Further, determination on whether or not to perform control to a lane with worn and blurred lines can be made to each of the left and right sides, and therefore erroneous control due to erroneous detection can be avoided and a more safety-sensitive system can be configured.

At the lane-to-lane control decision 510, determination is made whether the area-specific confidence of the left near 1020 is a near first predetermined value or more that is a threshold for the determination on whether or not to perform control.

In the case of Yes, it is determined as controllable, and then at curvature use determination 520, determination is made whether the area-specific confidence of the left far 1010 is a far first predetermined value or more that is a threshold for the determination on whether or not to perform control using curvature. In this case, determination is made whether the far confidence is the far first predetermined value or more. Since it cannot find the degree of curve of a road without seeing a far area, the far confidence is calculated depending on whether a large characteristics amount of white lines can be extracted on an image of the left far lane or whether such characteristics amount are roughly focused on a line on the image. When a large characteristics amount of white lines exist in the left far area and they are aligned linearly, it can be considered that the confidence is high and the estimated curvature shows a correct road shape, and vehicle control considering the degree of curve of the road is permitted.

Figure 10:
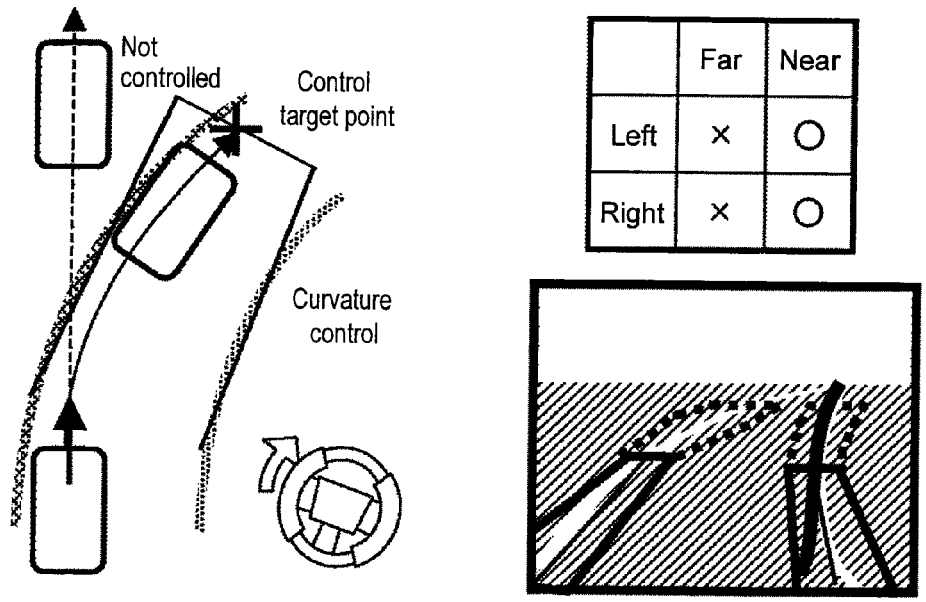
FIG. 10 describes conditions of area-specific confidence when control is performed using a straight line and the outline of the control.

As illustrated in FIG. 9, when not only near confidence but also far confidence are confirmed to be the corresponding first predetermined values or more, at the curvature use determination 520, a curve control mode 540 (Yes) is selected. Conversely as illustrated in FIG. 10, when far confidence is lower than the far first predetermined value, a straight control mode 550 (No) is selected at the curvature use determination 520.

When near confidence is high but far confidence is low, curvature is not used for the vehicle control. It is difficult to calculate curvature precisely unless lane recognition results not only for near but also for far can be acquired. When the confidence is low, an error of curvature precision might occur due to erroneous detection. Therefore, when the far confidence is low, the straight control mode 550 is to be selected to avoid erroneous control due to the curvature including an error.

Figure 11:
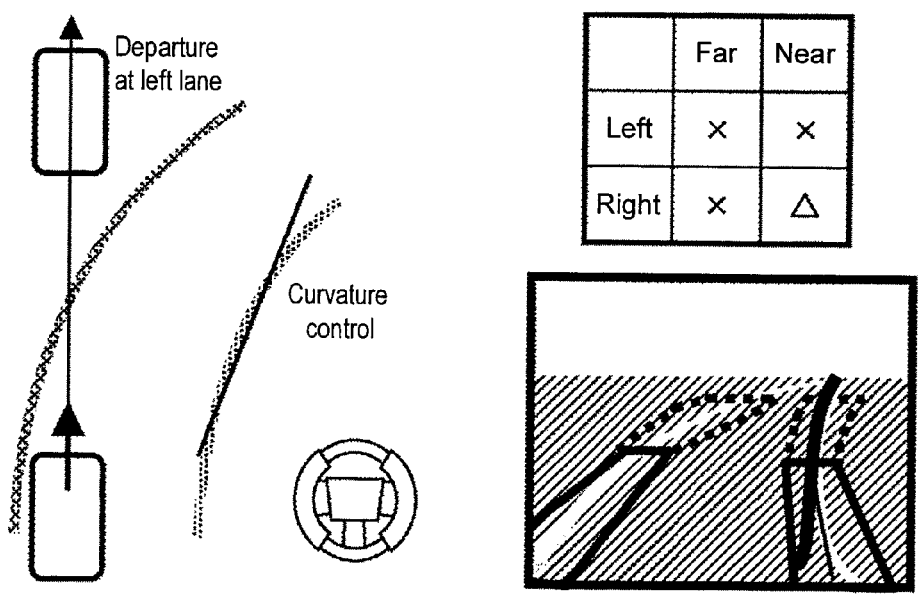
FIG. 11 describes conditions of area-specific confidence when alarm or warning of lane departure is issued.

A table of FIG. 11 shows the case of a warning mode for the right-side lane.

When the lane-to-lane control decision 510 results in No because the confidence is less than the near first predetermined value and when the left-near confidence is a near second predetermined value or more at warning determination 530, a warning mode 560 is selected where the precision of the lane recognition result cannot be trusted enough for vehicle control and so warning is displayed or alarm is sounded.

Since erroneous control is likely to adversely affect the vehicle safety, lane departure prevention control is performed only for the case with high confidence. Low confidence means high possibility of erroneous detection. In order to avoid erroneous control, even when a lane departure prevention device operates during erroneous detection, just erroneous warning is issued to give the discomfort to a driver but not to affect the vehicle safety for a system with a high level of safety.

When the lane-to-lane control decision 510 results in NO because the confidence is less than the near first predetermined value and then the confidence of the left near is less than the near second predetermined value at the warning determination 530, the confidence is too low to sound warning.

The details of the control modes are described in <Switching of vehicle control methods> later.

The present system is designed so that the area-specific confidence is used to select any one of the operations of the curve control mode 540, the straight control mode 550 due to degraded far confidence, the warning mode 560 due to degraded confidence and a stop mode 570 due to further degraded confidence. Among 540 to 570, a control mode with a smaller number means more sophisticated vehicle control to provide more comfortable driving support with a driver.

The curve control mode 540 and the straight control mode 550 are different for control in that a curved shape of a road is considered or not. In the straight control mode 550 without consideration given to a curved shape, delay occurs in departure control during curve traveling, and although departure timing can be delayed, departure cannot be completely prevented depending on the vehicle speed and the curvature. More comfortable control for a driver requires higher confidence of lane recognition. Conversely, sophisticated control cannot be performed on a road under bad conditions such as low far confidence. In such a case, however, a recognition result of near that is relatively easy to be recognized only is used, and safety-sensitive control with suppressed functions to suppress erroneous control can be performed.

When No indicating out-of-control is selected at the lane-to-lane control decision 510 in FIG. 3, vehicle control is not performed. However, when the near confidence is higher than the near second predetermined value at the warning determination 530, it is determined as Yes and the warning mode 560 is selected. When the confidence is lower than the near second predetermined value at the warning determination 530, the stop mode 570 is selected. From the viewpoint of safety and driver's convenience, erroneous control is to be avoided rather than erroneous warning, and then control, warning and stop are selected. The near second predetermined value is set lower than the near first predetermined value, and when the confidence is the near first predetermined value or more, the control mode (curve or straight) is selected. When the confidence is less than the near first predetermined value and the near second predetermined value or more, the warning mode 560 is selected, and when the confidence is less than the near second predetermined value, the stop mode 570 is selected.

FIGS. 7 and 8 are tables summarizing relationships between the area-specific confidence and the control.

Since vehicle control for the left and right lanes are performed symmetrically and independently to the left and right sides, the following describes vehicle control switching considering the relationships between upper and lower confidence.

As a threshold for determination on whether or not to use the curvature for vehicle control depending on the result of the far confidence, a far first predetermined value is set. As a threshold for switching vehicle control and warning depending on the result of near confidence, the near first predetermined value is set, and as a threshold for switching warning and stop, the near second predetermined value is set.

When far confidence is higher than the far first predetermined value and near confidence also is higher than the near first predetermined value, sophisticated curve control mode 540 is performed with consideration given to the degree of curve.

When far confidence is lower than the far first predetermined value and near confidence is higher than the near first predetermined value, the straight control mode 550 is performed without considering the degree of curve but assuming that the road is straight. This is because, although control for curve might be delayed, a safety-sensitive control method suppressing erroneous control is to be performed on fears that curvature precision is degraded due to erroneous far detection or an undetected case of a far area.

When far confidence is lower than the far first predetermined value and near confidence is lower than the near first predetermined value but higher than the near second predetermined value, the warning mode 560 is performed, which is more safety-sensitive in fears of erroneous vehicle control.

When far confidence is lower than the far first predetermined value and near confidence also is lower than the near second predetermined value, the stop mode 570 is performed, where control and warning is to be stopped because the recognized state is determined not enough for control and warning.

When far confidence is higher the far first predetermined value and near confidence is lower than the near first predetermined value, such confidence cannot exist in the assumed calculation method, and therefore there is no corresponding control method thereto.

The details thereof are described in section for a confidence calculation method. When a lane is visible only in the distance in spite of the absence of a near lane, there is high possibility of erroneous detection, and therefore calculation of confidence is performed concerning continuity from the near lane information. In this way, since the near confidence affects the far confidence, there is no case where the far confidence only is high.

In the present embodiment, switching is performed between the curve control mode 540 and the straight control mode 550. However, such switching may be performed so as to always have an intermediate value therebetween so that an intermediate target path is set between curve and straight depending on the degree of confidence.

Figure 14:
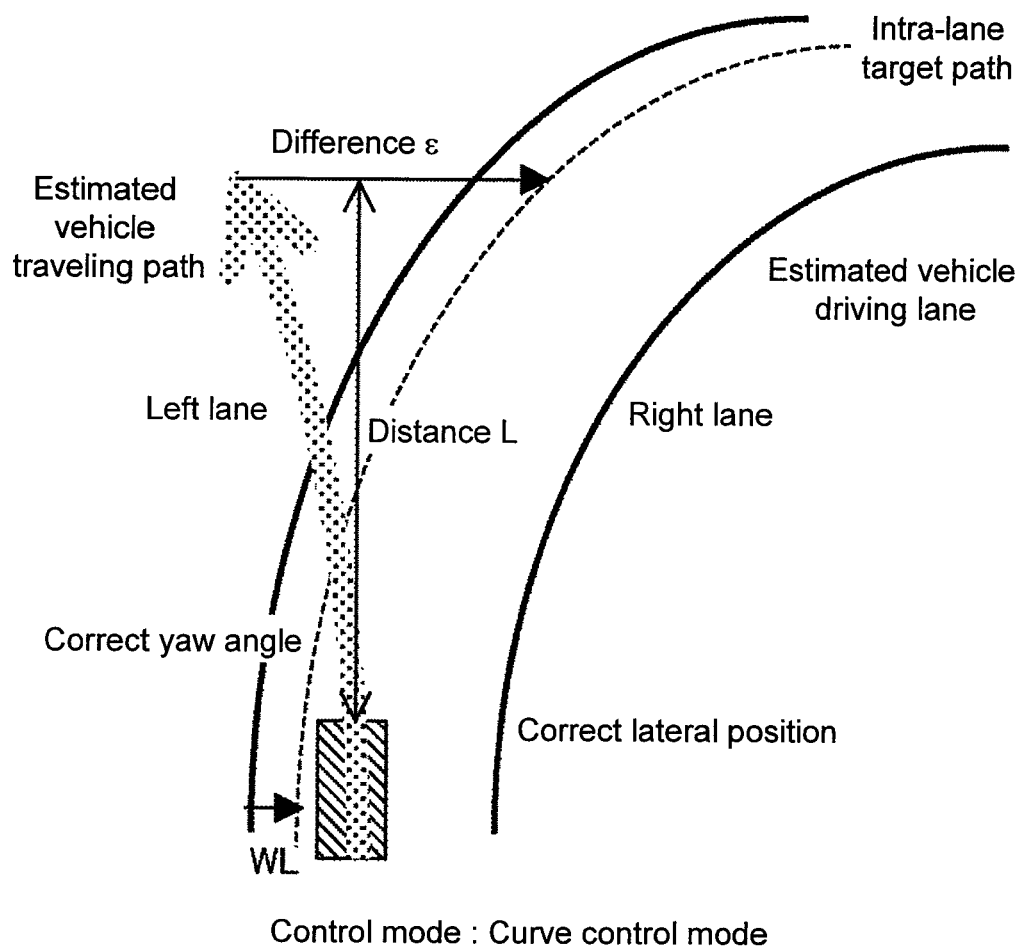
FIG. 14 describes the calculation of a difference from a target path in the case of a curve control mode.
Figure 16:
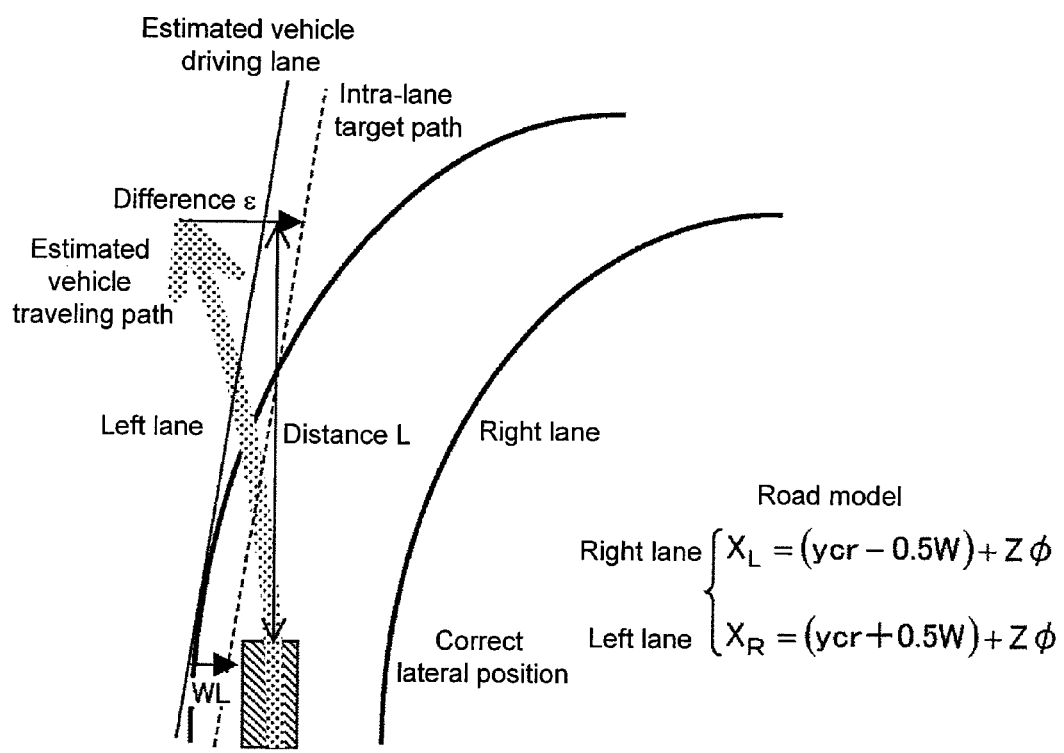
FIG. 16 describes the calculation of a difference from a target path in the case of a straight control mode.

Referring to FIG. 14 and FIG. 16, as the far confidence increases, more intense steering control closer to the curve of FIG. 14 is performed, and as the far confidence becomes closer to the far first predetermined value, less intense steering control close to the straight line of FIG. 16 is performed. In this way, the intense of steering control may be varied with the confidence.

Further, a time constant may be set so that even when the mode is switched, the control amount is not changed greatly and the switching gradually influences on the control.

<Area Division Method>

In the present embodiment, as illustrated in FIG. 4, the camera area is divided into four areas in total including left far 1010, left near 1020, right far 1050 and right near 1060.

In the case of lane recognition using a camera, the image of a lane will be smaller when a far area is a target for recognition, and in general it becomes difficult to recognize such a far area. Further, there is higher possibility of including an object other than a road surface in the camera image of a far area, and therefore a road shoulder, a leading vehicle, an obstacle and the like hinder the lane recognition and the recognition tends to have difficulty.

When confidence is calculated for the overall lane as in the conventional techniques, erroneous detection of a far area or an undetected case of a far area degrades confidence of the overall lane, and even when a near area can be clearly recognized in the image, the vehicle control is stopped so as to avoid erroneous control. Assuming the case where erroneous detection occurs only in a far area but a near lane can be recognized, it is preferable to perform control using the recognition result of the near area only. Further assuming the case where Bott's dots and faint white lines are not detected only in a far area but a near lane thereof can be recognized, it is preferable to perform control using the recognition result of the near area only in this case as well.

According to the present embodiment, area-specific confidence is used, whereby a lane recognition status can be determined for each of far and near and left and right areas for the selection of an optimum control mode. Thereby, although limited control not considering a curved state of the road in the distant is performed for a road when a lane of a far area only cannot be recognized, the control applicable range can be expanded for a limited straight control mode while eliminating adverse effect on control due to erroneous detection or an undetected case.

Although the area is divided into two in the distance direction in the present embodiment, the number of divisions may be different depending on the distance of a far area as a target of recognition, and similar effects can be expected therefrom. Considering the case of broken lines, however, an area in the distance direction is preferably about 20 m or more (in the case of 20 m or more, even when the line includes broken lines, both of a solid-line part and a gap between the solid-lines are within the area, and therefore the area should include a white line). When the area is too short, for example, in the case of about 10 m, all of the white lines may disappear from the image instantaneously. In such a case, it is difficult to determine whether or not to use the image for control. The area may be dynamically changed in the distance direction depending on the recognition state.

Figure 22:
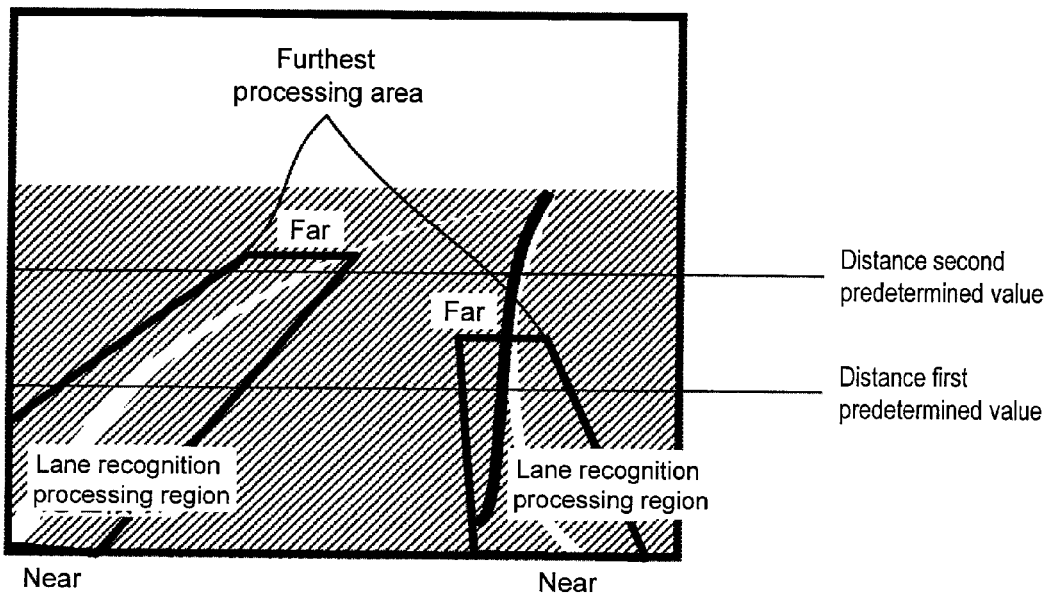
FIG. 22 describes a method to dynamically change a distance of a far area in accordance with confidence.

As illustrated in FIG. 22, instead of dividing an area in the distance direction, a far distance of the area may be changed dynamically depending on the confidence. As illustrated in FIG. 22, a processing area for lane recognition is changed for the furthest distance decided for the left and right lanes depending on the confidence. When the confidence decreases, the far distance of the area is shortened because the far area tends to cause erroneous detection and an undetected case. Conversely when the confidence increases, it is determined that the lane position can be recognized correctly and in the following frame the processing area is extended to far so as to further improve lane recognition precision, especially estimation precision of curvature, whereby the processing area is set so as to facilitate the estimation of the curve degree of the road.

As illustrated in the left lane of FIG. 22, when the distance is a distance second predetermined value (further than the distance second predetermined value) and when the area-specific confidence up to this distance is a distance change first predetermined value or more, it is considered that the confidence from far to near in the processing area is high and the area has a long distance from far to near and the area has a sufficient length for estimation of the curvature indicating the degree of curve of the road, and the vehicle is controlled in the curve control mode 540.

As illustrated in the right lane of FIG. 22, when the furthest distance in the processing area is less than a distance first predetermined value and the distance second predetermined value or more, and the confidence is the distance change first predetermined value or more, the vehicle is controlled in the straight control mode 550.

When the furthest distance in the processing area is less than the distance first predetermined value and the confidence is the distance change first predetermined value or more, the warning mode 560 is selected.

When the furthest distance in the processing area is less than the distance second predetermined value and the confidence is less than the distance change first predetermined value, the stop mode 570 is selected.

Basically similar to the case of four-division, the control mode is selected in accordance with the length of the area in the distance direction having confidence of a predetermined value or more and the confidence, and the actions and effects obtained therefrom also are the same.

In the present embodiment, the image is divided into up and down (distance direction) and further into left and right. There is a case where left and right lanes have a considerable difference in recognizability, for instance, in the case of lanes worn on only one of the left and right sides, a lane having low contrast with the road surface or Bott's dots. Such a road state tends to last relatively long. For this reason, in the conventional techniques, there is a case where confidence of the overall lane is degraded because one-side lane is invisible, and vehicle control cannot be performed continuously.

As in the present embodiment where confidence is set for each of the left and right sides, control can be performed when confidence is high even in only one-side lane, and therefore the application range of control can be expanded.

If the application range of vehicle control is expanded in the conventional techniques, vehicle control will be performed in spite of relatively low confidence. In such a case, the vehicle control will be performed and alarm will be issued for the lane that is not sufficiently recognized, which is an undesirable state from the viewpoint of erroneous operation of the lane departure prevention controller.

Figure 5:
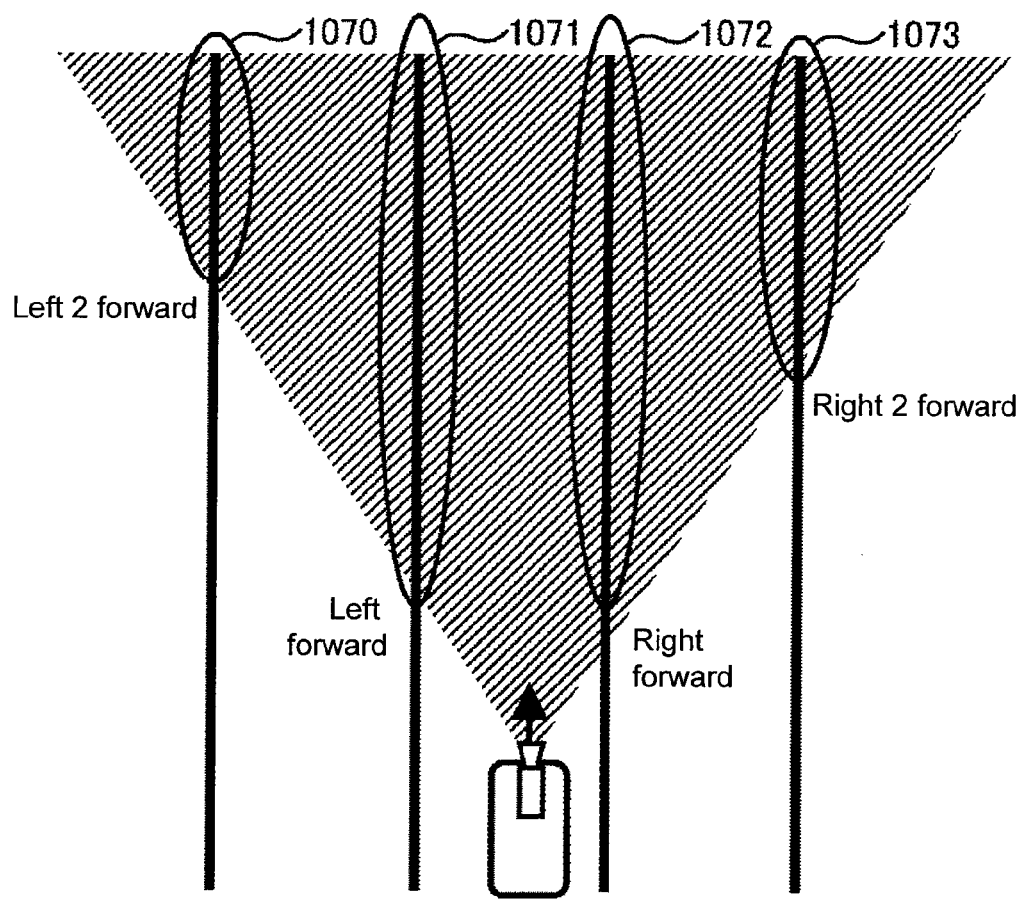
FIG. 5 describes the case where an area is divided to lane-to-lane in the present invention.

Although the area-division is performed for each of the left and right lanes of the driving lane in the present embodiment, areas may be provided for each lane as illustrated in FIG. 5. When a camera having a wide view is used, not only the left and right lanes 1071 and 1072 of the driving lane but also adjacent lanes 1070 and 1073 become a target of recognition.

The adjacent lanes 1070 and 1073 used as a target of recognition allow quick response to the vehicle control using the driving lane 1072 and 1073 even after the vehicle shifts to the right side lane in FIG. 5, for example. The provision of areas for four lanes is decided at the stage where the system concept such as a view angle of a camera and a control method is decided, and the area determination section 410 determines the left lane that is the nearest of the vehicle as a recognition result of this image processing area while checking against the recognition result. Using information such as the image processing area, the recognition result and the intermediate result, the area-specific confidence is calculated.

When the confidence is clearly low, the existence of a lane after lane change is suspected (existence of an obstacle, outside of a road), and warning may be issued prior to the lane change.

The area-specific confidence further lead to the advantage of decreasing or eliminating the influence by the lane of the area having low confidence on a yaw angle and curvature when a yaw angle and curvature are estimated as control parameters later. Assuming that all lanes are parallel and have similar curvature, control parameters can be estimated using white lines in the area having confidence of a predetermined value or more.

Based on the same idea as above, the vanishing point of the camera can be automatically updated using the lane information in the area having high confidence only, whereby the depression angle of the camera can be automatically updated more precisely, whereby parameters can be estimated more precisely and the recognition stability after that also can be increased.

Figure 6:
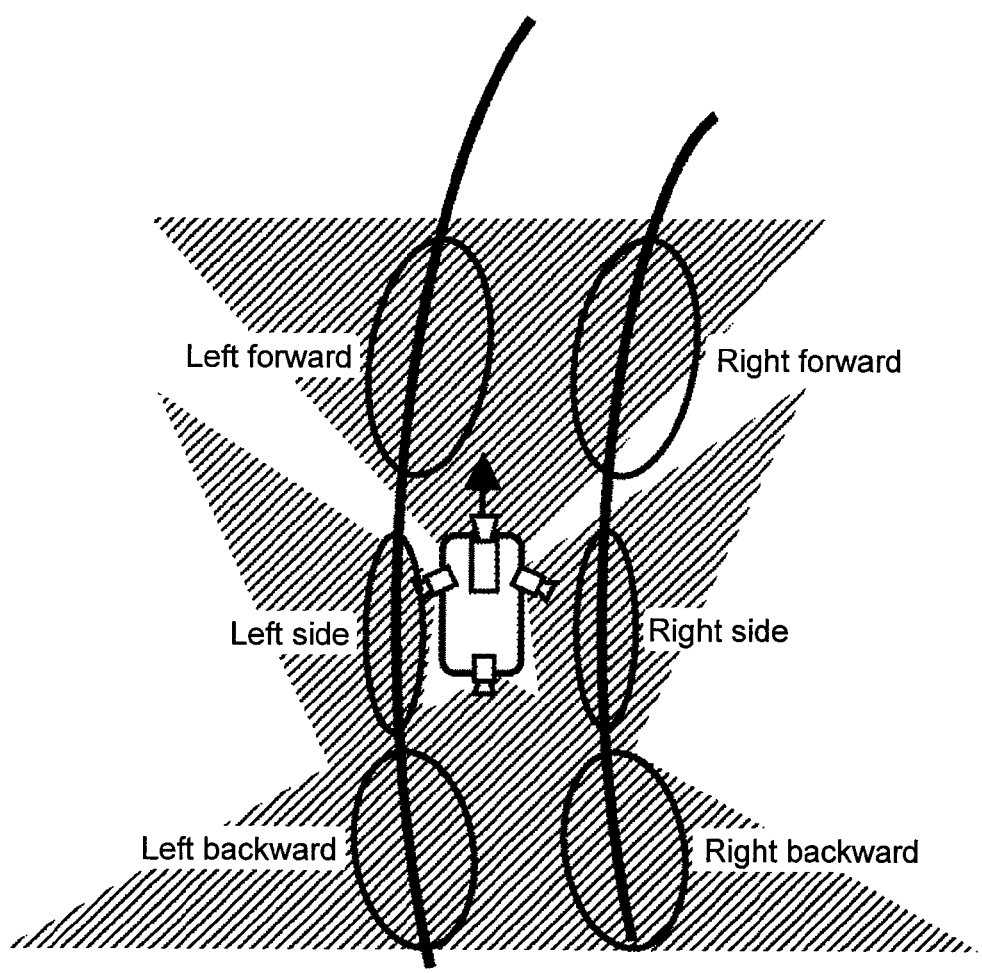
FIG. 6 describes the case where an area is divided into camera-to-camera and lane-to-lane in the present invention.

The area may be divided for each camera. FIG. 6 illustrates an example where the area is divided into a view of each camera. Similar effects to the division into left and right and up and down can be expected from the area division for each camera as well. The area division for each camera allows control parameters to be estimated with less influence by a recognition result of an area having low confidence or free from such influences, and so not only high precision but also high reliability can be obtained.

The area-division method may be decided at the stage where the system concept such as a view angle of a camera and a control method is decided.

As for the lane recognition section 200, a forward camera is similar to the above and is different only in that the forward camera does not detect the curvature of a far area. The recognition method of the backward camera also is similar, but is different only in that back and force of the vehicle are reversed. As for a side camera also, such a camera extracts the characteristics amount of white lines in an image and recognizes a straight line having a lot of characteristics amount of white lines linearly aligned as a lane. Note here that an image of a straight line on the right side of the vehicle is processed by the forward, the right side and the backward cameras, and therefore the control parameter estimation section 300 removes values out of the straight line result extracted from these cameras, smoothes the values temporally and spatially and estimates a relative lateral position between the vehicle and a lane and a yaw angle.

As for the left and right side cameras for an area specific to each camera, the area determination section 410 simply associates the camera with the area-specific confidence. Since the forward camera and the backward camera recognize left and right lanes of the vehicle, confidence for the left lane of the vehicle is calculated based on the correspondence relationship between the location of the vehicle and the lane.

In FIG. 6, when four cameras including forward, backward, left side and right side are provided, the area can be divided into six areas including left forward, left side, left backward, right forward, right side and right backward.

<Area-Specific Confidence Calculation Section 400>

With respect to each area divided by the area determination section 410 described in FIG. 2, the area-specific confidence calculation section 420 calculates area-specific confidence on the basis of image information captured. In order to calculate the area-specific confidence from image information, three types of information including the characteristics amount of white lines, three-dimensional information and time-series information is used, which is described later in details. The area-specific confidence is calculated as numerical values of 100 to 0 on the basis of such information, thus making it possible to represent the recognition state of lanes appropriately.

As the area-specific confidence, a value is obtained by multiplying the product of the scores (1 to 0) including the score of the characteristics amount of white lines, the score of the three-dimensional information and the score of the time-series information by 100.

Each score is represented as 1 at maximum and as 0 at minimum, where a higher numerical value indicates higher confidence. The following specifically describes the characteristics amount of white lines, the three-dimensional information and the time-series information used to calculate area-specific confidence.

Characteristics Amount of White Lines

Lane marks on an image are extracted using luminance difference information with reference to a road surface, a luminance change pattern, thickness information of lane marks on the road surface, shape information or the like. Confidence for white lines is calculated on the basis of the amount of white lines using such information or the intensity indicating whether the characteristics amount of white lines is crowded or distributed on a line. The characteristics amount of white lines enables the confidence to reflect how much information looking like lanes exists on a road, and the intensity to a line enables the confidence to reflect whether such characteristics amount is noise distributing on an image or not. Conceivably in the case of less characteristics amount of white lines or where the characteristics amount is not focused on a line, it is not appropriate to use such information for control from the safety viewpoint, and confidence is calculated.

In the lane on the image captured by the vehicle-mounted camera 600, confidence is calculated on the basis of the degree of characteristics amount of white lines aligned on a line existing in the processing area determined by the area determination section 410. In the case where an ideal straight and solid white line exists in the area, the characteristics amount of white lines is set at 1. On the other hand, in the case where no characteristics amount exit or it cannot be determined that the characteristics amount is aligned on a line, the characteristics amount of white lines is set at 0. It can be represented by an expression as follows. Herein, even in the case where the amount exceeds 1 due to some reason, the value of the characteristics amount of white lines is set not exceeding 1 by truncation processing. The amount does not take on negative values.

[Expression 1]

$$\left(\begin{array}{c}\text{White line characteristics}\\ \text{amount score}\end{array}\right) = \frac{\left(\begin{array}{c}\text{The number of white line characteristics}\\ \text{amount linearly aligned in an area}\end{array}\right)}{\left(\begin{array}{c}\text{The number of white line characteristics}\\ \text{amount for ideal straight/solid white}\\ \text{line in the area}\end{array}\right)} \quad \text{FORMULA (1)}$$

Three Dimensional Information Using Camera Geometry

Confidence is calculated by determining as to whether the extracted characteristics amount of white lines is an appropriate value or not for a three-dimensional road structure.

Confidence is calculated on the basis of the parallelism of left and right lanes, the smoothness as a curve and the continuity of existence of characteristic amount from near to far. In this case, evaluation of the confidence is made not for each area but for a relationship between areas. For instance, as for the parallelism, as the left and right parallelism is lower, the overall confidence also is lowered. In the case of the smoothness as a curve, the confidence of a far region of the region determined as not-smooth is lowered. This is because erroneous detection is less in near areas but more in far areas in principle.

Also when it is determined that the continuity of an upper part and a lower part of an image lacks the smoothness, the confidence of a far area is lowered for a similar reason. In this way, when the extracted characteristics amount of white lines is not appropriate by comparing it with a three-dimensional road structure, calculation is performed to lower the confidence. Thereby, the numerical value of the confidence can reflect whether the confidence can be appropriately used for vehicle control or not.

Firstly, when only a near area can be recognized, the curvature of the road is not used, and therefore the score is determined using the parallelism only. A three-dimensional information scoring method varies with an area. When a recognition result on the left and right lanes at a near area is ideal and determines that lanes on the both sides are completely parallel, the value is set at 0, and a threshold for an error in angle of both white lanes, which are can be permitted as an error, is set at 6 degrees. When an error of parallelism is 6 degrees as the threshold, the three-dimensional information score thereof is set at 0.5. When an error is 12 degrees or higher, the information score is set at 0. In this way, three-dimensional information scoring is performed in accordance with the magnitude of an error in parallelism. The following describes a calculation method of a three-dimensional information score for a left and right near area. In the case of a near area, the score thereof is determined on the basis of the parallelism of left and right sides, and therefore the left and right areas have the exactly same score.

Near area (three-dimensional information score calculation expression for left or right)

[Expression 2]

$$\begin{pmatrix} \text{Three-dimensional} \\ \text{information score} \end{pmatrix} = \qquad \text{FORMULA (2)}$$
$$1 - \frac{\text{Parallelism angular error}}{\text{Angular error of 12 degrees (fixed value)}}$$

where in the case of the error in angle of 12 degrees or higher, the three-dimensional information score is set at 0 irrespective of the result of this expression.

Time-Series Information

When the white lane position on an image and the characteristics amount of white lanes on an image change rapidly, the confidence is lowered as a whole. Such a rapid change is considered as the possibility of erroneous detection of a road shoulder or a vehicle instead of the lane detected. However, considering the case of lane marks as broken lines, for example, i.e., a periodic change of the characteristics amount on the image, confidence is to be calculated.

Two broken lines include one set of a broken line and a space of 20 m as one period. Therefore, while considering the vehicle speed, when the characteristics amount changes periodically with each traveling of 20 m, such a change is a proof of broken-lines recognition. Then, although the characteristics amount is less than that of a solid line, confidence of time-series information is heightened so as to increase confidence. In the case where the characteristics amount of white line, the luminance difference and the thickness are constant as in the ideal solid white line, a time-series information score is set at 1. Further, in the case where the characteristic amount of white lines changes periodically every time the vehicle travels by a length of about 20 m and a fixed length, the confidence is set higher. Comparing with data on past traveling of certain meters, the height of the score is decided in accordance with the length of the past traveling of the certain meters as to whether the periodic agreement is found or not. When no periodicity is found, the score is set at 0. As compared with data of the past 400 [m], when periodicity is found in the data of the recent traveling of 20 [m], the confidence is set at 1. In the case of the past 100 [m], the confidence is set at 0.25.

<Area-Specific Confidence Correction Section 430 (External Information)>

The following describes the processing by the area-specific confidence correction section 430 using information from the external information section 450.

Herein, determination is made for the confidence of 100 to 0 calculated by the area-specific confidence calculation section 420 as to whether the confidence includes erroneous detection factor or not on the basis of external information, and correction processing is performed to lower the confidence in accordance with a result of the determination.

Firstly, confidence correction processing is performed using external information. The following describes correction processing using various types of external information.

A vehicle behavior section 351 is vehicle-state detection means such as a sensor or the like for the vehicle. Using a vehicle-speed sensor, a steering-angle sensor, a yaw-rate sensor and the like measured by this detection means, a traveling path of the vehicle can be estimated. By comparing this traveling path with vehicle control parameters (estimated curvature, a yaw angle and a lateral position), confidence is corrected. For instance, when the lateral position changes greatly, confidence of an area on the lane side whose lateral position has greatly changed is lowered for near and far. Conversely, even when the lateral position is stable but the values of a yaw angle and curvature change rapidly, erroneous detection is likely to occur at a far area only. Therefore, confidence for a far area is lowered.

Even when the lateral position and the yaw angle as the vehicle control parameters are stable during stable steering without a rapid steering operation such as lane change, there is a predetermined value or more of difference between the curvature of a traveling path estimated by the vehicle behavior section 351 and the curvature as a result of camera recognition, confidence is lowered to half because erroneous detection at a far area is suspected.

When the camera recognition result shows a straight road with the substantial curvature of 0, and when changes in the yaw angle and the lateral position of the camera recognition result cannot be obtained in accordance with the steering operation, erroneous detection is suspected, and so confidence at far and near areas is lowered to half.

The radar section 452 may be a millimeter-wave radar, a laser radar or a stereo camera. When the radar section 452 finds another vehicle or a three-dimensional object that might be an obstacle for photographing of white lines on a road surface from the vehicle, confidence at an area on an image where such an obstacle might be reflected is lowered. Due to invisible while lanes by the obstacle, there is high possibility of the not-detected state with low confidence or the state of high confidence being obtained in spite of erroneous detection. Then, confidence is lowered corresponding to the ratio of the obstacle occupying the area. When the obstacle occupies 70% of the area, the confidence calculated by the area-specific confidence calculation section 400 is lowered by 70%. In this way, confidence is set specific to each area, whereby propagation of erroneous detection factors can be prevented and vehicle control free from a result on a part including erroneous detection factors can be performed.

The navigation-information section 453 is a navigation device. The curvature of map information acquired from the navigation device is compared with the estimated curvature as the vehicle control parameters, and when a result of the comparison shows a predetermined value or more of difference, erroneous detection is likely to occur at a far area, and therefore confidence at a far area is lowered. Thereby, confidence can reflect erroneous detection at a far area.

The other camera section 454 compares a recognition result of another camera with a lateral position, a yaw angle and curvature, and when they do not match, confidence is lowered.

In this way, using information from the vehicle behavior section 451, the radar section 452, the navigation-information section 453 and the other camera section 454, lane recognition confidence can be calculated using information from other than the camera, whereby confidence can be calculated more precisely. As a result, a vehicle control mode also can be selected more precisely. Although more precise control can be performed with external information, such external information does not have to be used always.

When an area with apparent low confidence and an area with high confidence are mixed, influences by the area with confidence of a predetermined value or lower may be removed and control parameters may be estimated again. This can prevent degradation of the precision of the control parameters due to erroneous detection as well as erroneous detection.

<Switching of Vehicle Control Methods in Accordance with Area-Specific Confidence>

Figure 23:
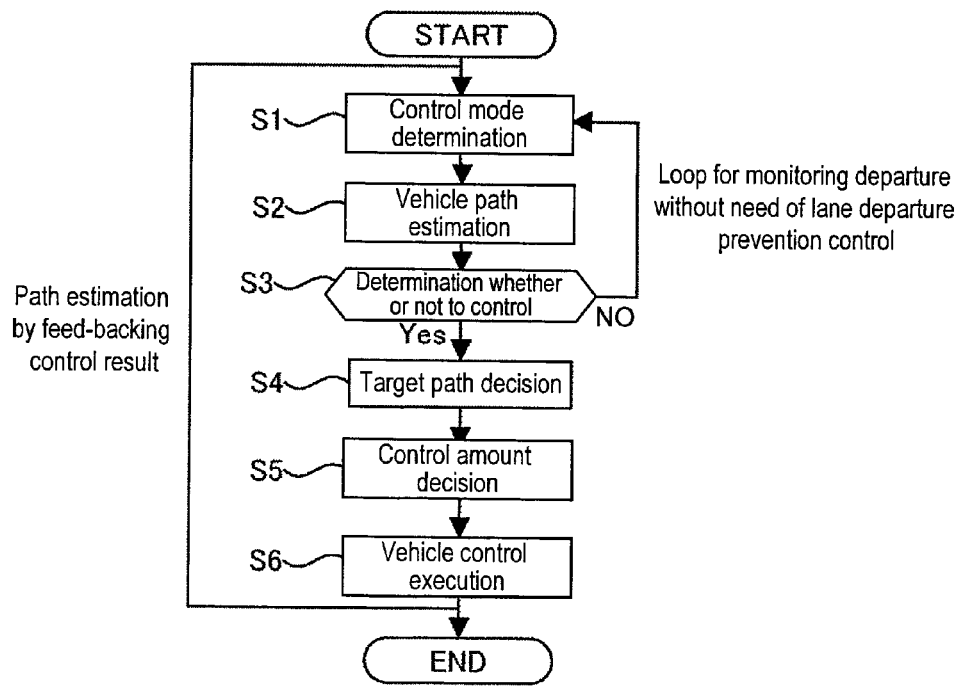
FIG. 23 is a flowchart illustrating a vehicle control method in accordance with area-specific confidence of the present invention.

FIG. 23 is a flowchart of a vehicle control method in accordance with area-specific confidence performed by the vehicle control section corresponding to area-specific confidence 500.

Firstly, the control mode determination section corresponding to area-specific confidence 501 determines a control mode (S1).

Figure 12:
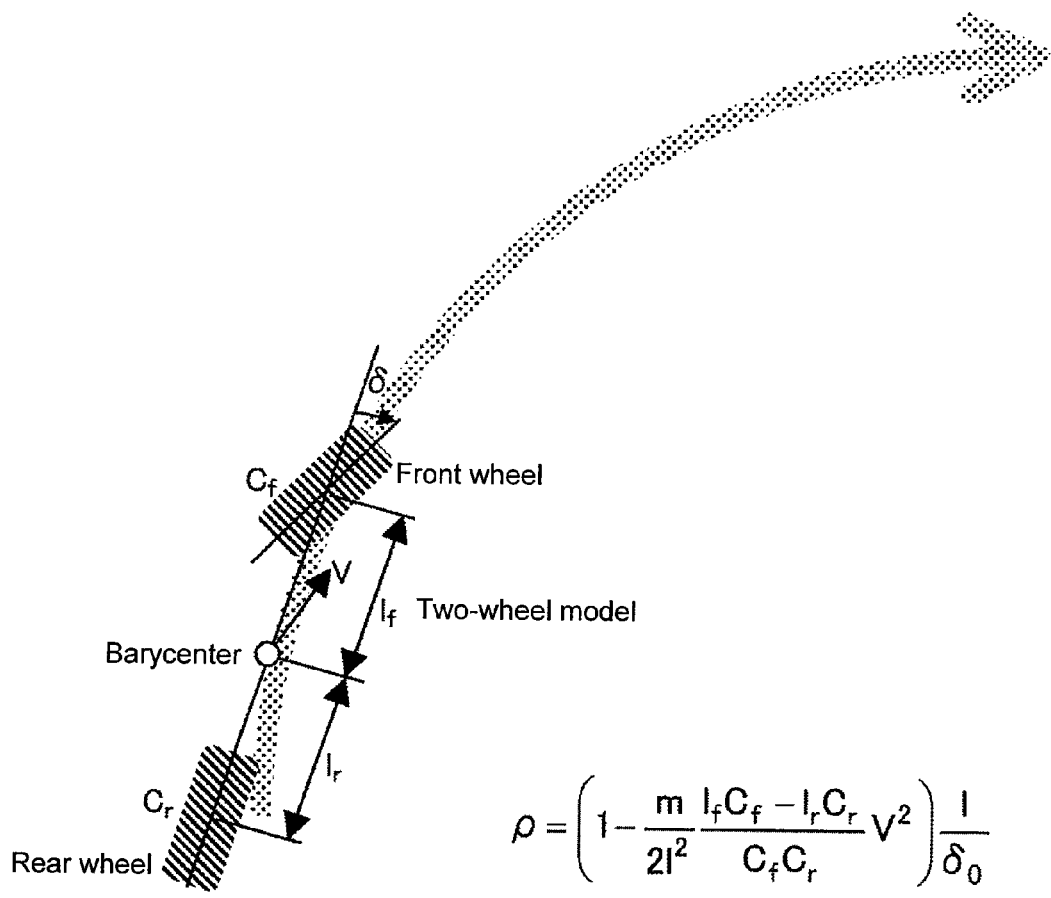
FIG. 12 describes an estimated path using a two-wheel model in the present invention.

Thereafter, on the basis of vehicle-speed information and rudder-angle information of the vehicle, the vehicle path estimation section 502 uses the expression illustrated in FIG. 12 to estimate a traveling path of the vehicle (S2).

Figure 13:
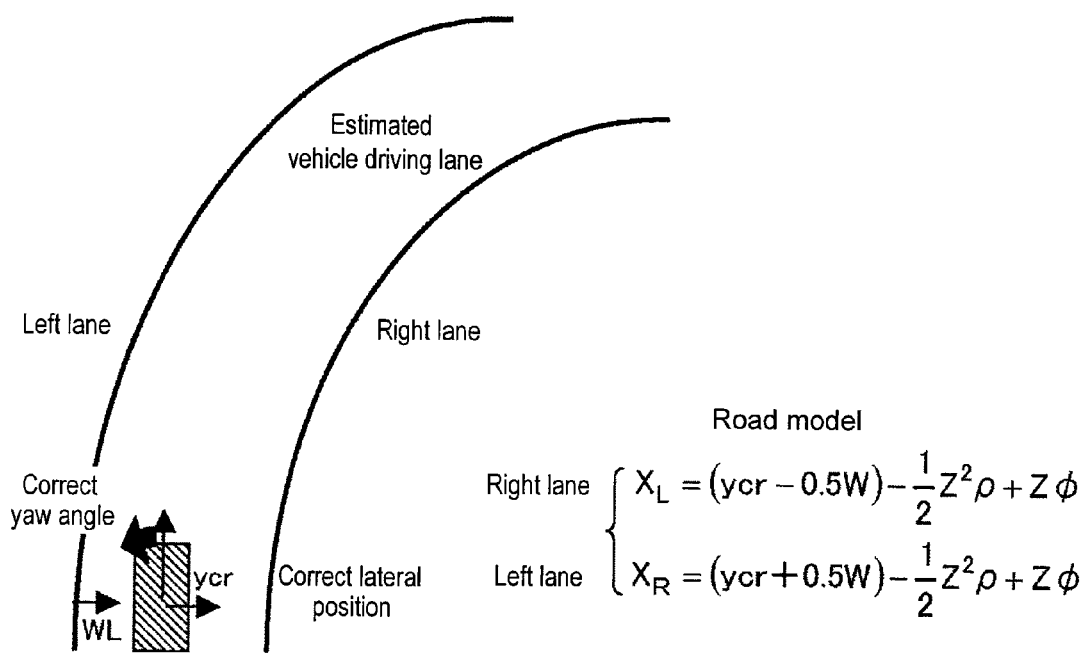
FIG. 13 describes the calculation of a target path in the case of a curve control mode.

As illustrated in FIG. 13, on the basis of a relative lateral position of a lane with reference to the vehicle, the yaw angle and the road curvature estimated by the control parameter estimation section, a driving lane of the vehicle is estimated. Comparing the vehicle driving lane estimated by the control determination section 503 and the vehicle estimated traveling path estimated by the vehicle path estimation section 502, determination is made as to whether or not to perform the control (S3). As illustrated in FIG. 14, the possibility of lane departure is determined at a position L[m] away from the vehicle, determination is firstly made as to whether or not to perform the vehicle control.

In the case of No where control is not to be performed, the procedure stands by for the processing at S1 until a lane recognition result is updated again, and every time a recognition result is updated, determination on control modes is performed.

In the case of Yes where control is to be performed, the procedure goes to S4 to decide a target path.

The control amount decision section 504 decides a target path in the case of a curve control mode illustrated in FIG. 14 on the basis of the vehicle estimated traveling path and the estimated vehicle driving lane (S4). An intra-lane target path in FIG. 14 is decided.

Comparing the thus set target path with the vehicle estimated traveling path, the control amount decision section 504 decides a control amount in accordance with the magnitude of a difference at a place away by L[m] (S5).

On the basis of the thus decided control amount, the vehicle control execution section 505 performs vehicle control, and a result of the performance is fed-back to the vehicle path estimation S2 in the next frame (S6).

Vehicle Estimated Traveling Path

The following description is on a commonly used control method. Feed-back control is performed so as to make the vehicle estimated path at a place ahead by L[m] from the vehicle closer to the target path. As illustrated in FIG. 12, Expression (3) for approximation of the behavior of a four-wheel vehicle with a two-wheel model having front and rear wheels only is used for the estimated path, whereby a vehicle traveling path is estimated by entering steering-angle and vehicle-speed information of the vehicle.

[Expression 3]

$$\rho = \left(1 - \frac{m}{2l^2}\frac{l_f C_f - l_r C_r}{C_f C_r}V^2\right)\frac{1}{\delta_0} \qquad \text{FORMULA (3)}$$

[Descriptions on Variables]
ρ: circling radius
m: vehicle weight
$l_f$, $l_r$: barycenter to front (rear) wheel distance
$l=l_f+l_r$: front to rear wheel distance
$C_f(C_r)$: tire cornering power of front (rear) wheel
V: vehicle speed
$\delta_0$: forward wheel rudder angle Decision of Target Path and Decision of Control Amount Next, using a lane recognition result by a camera, a target path is calculated to control the vehicle so as not to depart when lane departure is likely to occur. This vehicle control method switches between two target path calculation methods of the curve control mode 540 using a curve shape of a road and the straight control mode 550 not using a curved shape on the basis of the lane recognition result by a camera and its area-specific confidence.

Control parameters recognized by the camera include a relative lateral position between the vehicle and a lane, a yaw angle indicating relative inclination and the curvature indicating the degree of curve of a road. Using these parameters, a vehicle driving lane is estimated. Next, on the basis of this vehicle driving lane, a target path is calculated. Control is performed to push the vehicle back when the vehicle is about to depart from the lane. In this case, control is performed independently to the left and right recognized lanes. The following describes two types of target path calculation methods for the control modes.

Target Path Calculation [Curve Control Mode 540]

In the case of the curve control mode 540, a vehicle driving lane is estimated using the curvature as an estimation result of the vehicle control parameters. As illustrated in FIG. 13, the inside WL [m] of the lane along the curve of this estimated vehicle driving lane is set as the target path. As illustrated in FIG. 14, a differences is calculated between the vehicle estimated traveling path and the target path at a place ahead by L[m] of the vehicle, and feed-back control is performed so that this difference becomes 0 [m]. Similarly, feed-back control is performed for the right side as well to be a traveling path of inside WR [m] of the estimated right-side lane.

Target Path Calculation [Straight Control Mode 550]

Figure 15:
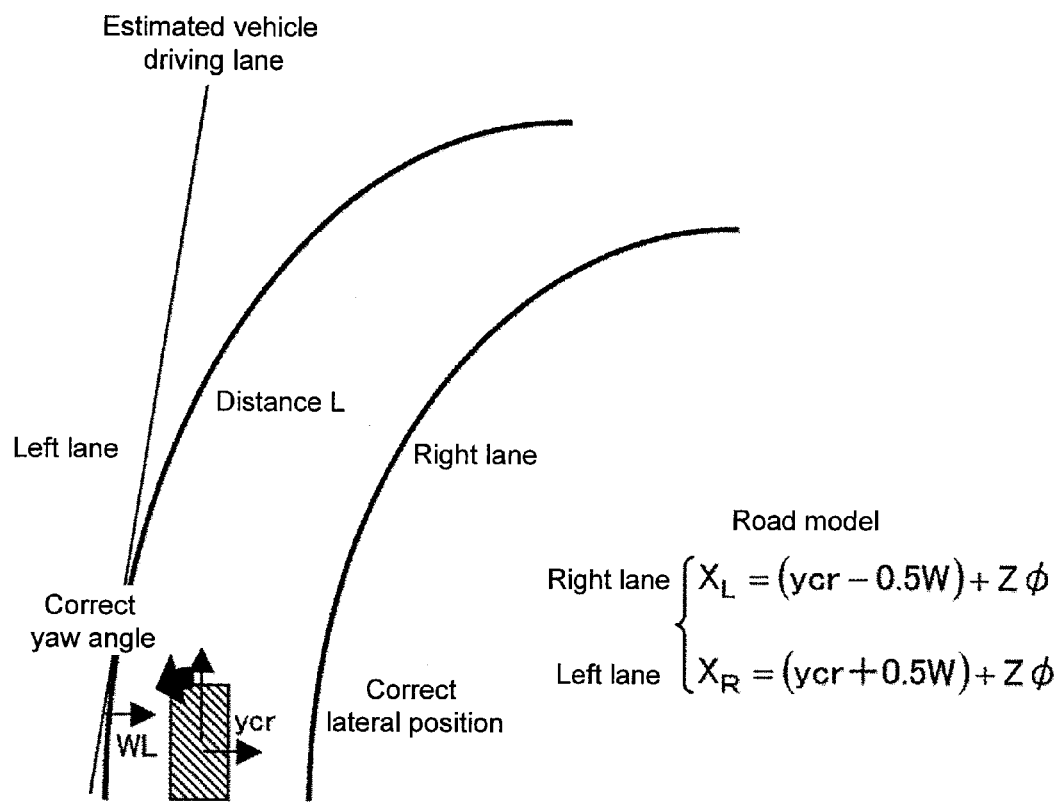
FIG. 15 describes the calculation of a target path in the case of a straight control mode.

In the case of the straight control mode 550, the road is assumed as straight and without using the curvature as an estimation result of the vehicle control parameters, a vehicle driving lane is estimated. In FIG. 15, in the case where the actual road is curved, inside WL [m] of the estimated vehicle driving lane assumed as straight is set as a target path. As illustrated in FIG. 16, a differences is calculated between the vehicle estimated traveling path and the target path at a place ahead by L[m] of the vehicle, and feed-back control is performed so that this difference becomes 0 [m]. Similarly, feed-back control is performed for the right side as well to be a traveling path of inside WR [m] of the estimated right-side lane. In the case of straight traveling, a large difference ε is not generated as compared with the curve control mode 540. However, as the curve becomes shaper, the differences increases.

As illustrated in FIG. 16, assuming a straight line, feed-back control is performed so as to follow the inside WL [m] (or WR [m]) of the lane. As is understood from FIG. 15 and FIG. 16, in the case of the straight control, the control amount pushing the vehicle, which is about to depart from the lane and fail to negotiate a curve, back to the inward of the lane tends to lack, and in the case of a sharp curve, control is likely to be performed just for delaying the timing of lane departure.

As a result of control performed using the erroneously detected curvature, there is possibility of erroneous-control of the vehicle to the direction of lane departure. On the other hand, in the case of vehicle control by approximating the road as a straight line, even if the control amount lacks, there is low possibility of controlling the vehicle to the direction departing from a curve, which can be said more safety-sensitive vehicle control.

When another vehicle in the distance hides a part of the vehicle driving lane or when the influences by Bott's dots, faint white lines or backlight make it difficult to detect far white lines from the vehicle, far lane recognition confidence is degraded. When the far white lines cannot be recognized, the curvature thereof has to be estimated from a limited part of a circle, i.e., a narrower range only, and therefore degradation of estimated precision is expected.

Precision may be degraded because of erroneous detection at a far part. In the case where confidence at a near area is high but confidence at a far area is law, bearable precision on the yaw angle and the lateral position can be sufficiently obtained in spite of the degraded curvature precision. Then, in the present method, a road shape capable of dealing with the lane departure prevention control at a gentle curve or at a straight road is regarded as a straight line, and vehicle control is performed using (the yaw angle and the lateral position).

Vehicle Control Execution

Vehicle control modes in the present embodiment include the following four patterns of A, B, C and D:

A) curve control mode 540 (curvature, yaw angle and lateral position);
B) straight control mode 550 (yaw angle and lateral position);
C) warning mode 560 (lateral position); and
D) stop mode (none of them).

Mode switching among these A, B, C and D is performed on the basis of confidence. The modes actually controlling a vehicle are two types of A and B where the aforementioned estimated path is calculated. As for C, this may be a method to display departure warning on a display or using a lamp. Alternatively, this may be a method to inform a driver of lane departure visually, aurally or tactually using alarm or vibration meaning warning. In the stop mode, control is not performed or warning is not issued at all because the area-specific confidence is low.

As in the conventional technique, when the confidence for a lane recognition result of an image as a whole is used, even when only a near part is visible and a far part is difficult seeing, the overall vehicle control is stopped from the viewpoint of erroneous control or erroneous alarm prevention.

That is, the conventional technique corresponds to simple switching between A and D of the present embodiment. When vehicle control is attempted in spite of low confidence in order to expand the application range of vehicle control, such vehicle control becomes a factor causing erroneous control.

Since the conventional technique cannot specify the area where erroneous detection is currently performed or the area that is not detected, reliable detection results cannot be categorized on the basis of the curvature, the yaw angle and the lateral position, and therefore for the safety reason, the operation has to be stopped without using all types of information.

As compared with this, in the new technique, area-specific confidence is used, whereby degradation of curvature precision can be determined from degradation of far area-specific confidence, and control modes are switched from the normal curve control mode to the straight control mode using an available yaw angle and lateral position while giving priority to erroneous control prevention. The area-specific confidence used can expand the application range of vehicle control while keeping high level of safety by preparing gradual control modes using reliable parameters only even for a road status where the operation of the vehicle is stopped conventionally.

<As for Display System>

Depending on the result of area-specific confidence, the status of the lane recognition result is displayed on the display 609 to inform a driver of such. A user can be informed of as to whether the lane departure prevention control is available or not by seeing the display whose luminance is heightened for high confidence or lowered with low confidence.

Area-specific operation allows a user to understand the lane recognition state for each of left and right and further for each of far and near, as well as to understand the operation status of the lane departure prevention control.

This function represents a variation of confidence with luminance, but this may be represented with colors or shapes.

Figure 20:
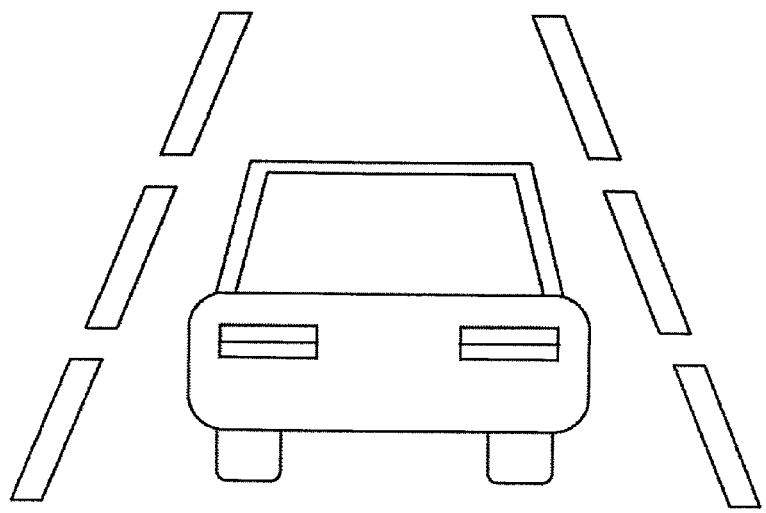
FIG. 20 illustrates exemplary display of vehicle control modes of the present invention.
Figure 21:
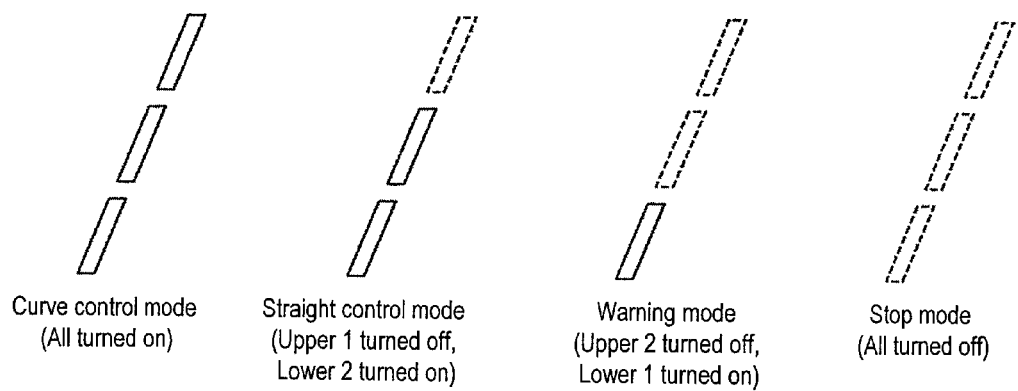
FIG. 21 illustrates an exemplary display form in accordance with vehicle control modes of the present invention.

The aforementioned display may be a display to inform a user of a control mode switched in accordance with the area-specific confidence. For instance, as illustrated in a control mode-specific display of FIG. 20, control modes are displayed independently for each of left and right sides. As illustrated in a control mode-specific display form of FIG. 21, display is changed in accordance with the control modes separately for left and right, whereby a user is allowed to understand a lane recognition status by a camera and understand the current control modes.

Therefore in the state where white lines are difficult seeing and the lane departure prevention function cannot be used, an effect of discouraging a driver from overestimating the lane departure prevention function can be expected.

<Vehicle Control in Accordance with Control Parameter-Specific Confidence>

Figure 17:
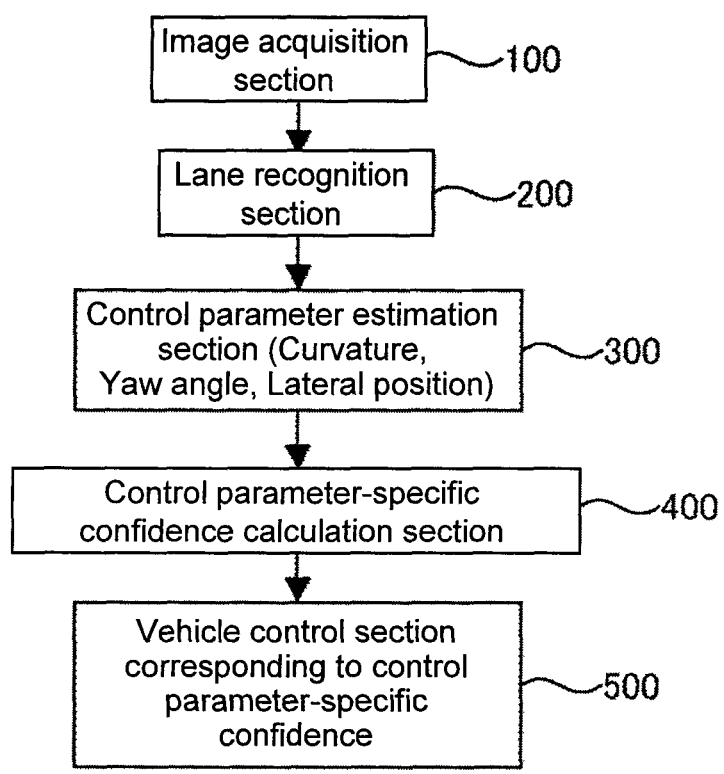
FIG. 17 illustrates another exemplary configuration of a lane departure prevention controller according to the present invention.
Figure 18:
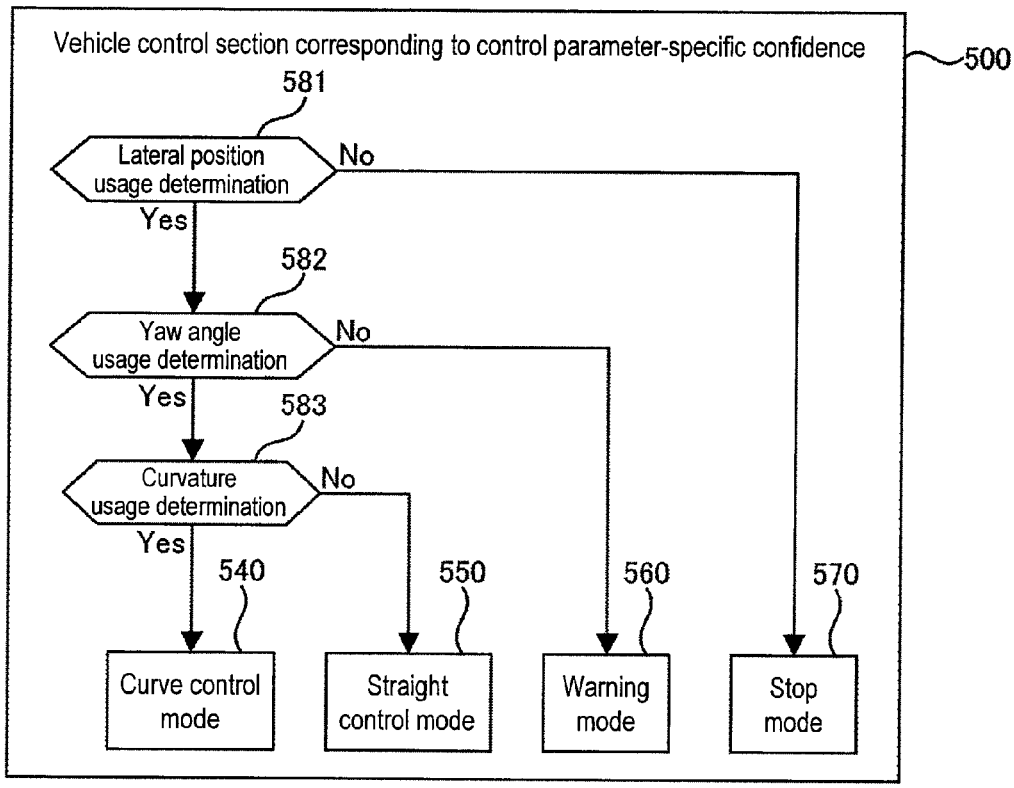
FIG. 18 is a flowchart illustrating vehicle control by the lane departure prevention controller of FIG. 17.

Confidence may be calculated in accordance with not the area-specific confidence but control parameters (curvature, yaw angle and lateral position). As illustrated in FIG. 17, although a parameter-specific confidence calculation section is used, confidence is calculated in a similar manner to that for the area-specific confidence, i.e., calculation is performed using the characteristic amount of white lines of an image processing result, three-dimensional information using camera geometry or time-series information thereof. This vehicle control method in accordance with the control parameter-specific confidence also has a different switching method of control modes as illustrated in FIG. 18. FIG. 18 illustrates a method of switching control modes in accordance with this control parameter-specific confidence. Firstly, at lateral position usage determination 581, whether or not to use a lateral position is determined in accordance with the confidence for lateral position. In the case of No at the lateral position usage determination, since the lateral position cannot be used, it is determined not to perform not only curve control and straight control but also the issuance of warning, and the stop mode 570 is selected. In the case of Yes at the lateral position usage determination, the procedure goes to yaw angle usage determination 582.

At the yaw angle usage determination 582, whether or not to use a yaw angle is determined in accordance with the confidence for yaw angle. In the case of No at the yaw angle usage determination 582, it is determined that a lateral position only is available, and the warning mode 560 using the lateral position is selected. In the case of Yes at the yaw angle usage determination 582, the procedure goes to curvature usage determination 583.

At the curvature usage determination 583, whether or not to use curvature is determined in accordance with the confidence for curvature. In the case of No at the curvature usage determination 583, it is determined that a yaw angle and a lateral position are available, and the straight control mode 550 using the yaw angle and the lateral position is selected. In the case of Yes at the curvature usage determination, the curve control mode 540 is selected.

Further, the area-specific confidence correction section 430 corrects this using information from the vehicle behavior section 451, the radar section 452, the navigation-information section 453 and the other camera section 454. When erroneous detection occurs at a far area or detection is not performed at a far area, since the far lane recognition result cannot be trusted, confidence for curvature is lowered, and a resultant thereof is used for the determination as to whether or not to use during vehicle control. Similarly, on the basis of confidence for a yaw angle and a lateral position, determination for control or warning is made as illustrated in the flowchart of FIG. 18.

The invention claimed is:

1. A vehicle controller, comprising:
a vehicle-mounted camera that captures an image in front of a vehicle;
a vehicle speed sensor that detects vehicle speed information;
a steering angle sensor that detects steering angle information;
a yaw rate sensor that detects yaw rate information; and
a processing unit that decides one vehicle control method from a plurality of vehicle control methods and controls an actuator with the decided vehicle control method, wherein
the vehicle-mounted camera includes: an image acquisition section that acquires an image in front of the vehicle; a lane recognition section that recognizes a lane from the acquired image; a control parameter estimation section that estimates road curvature indicating a degree of curve of a road, a yaw angle indicating relative orientation between the vehicle and a driving lane, and a lateral position indicating a relative position therebetween; and an area-specific confidence calculation section that divides the image acquired into a plurality of areas on a basis of the acquired image and the recognized lane, calculates confidence for each divided area and outputs area-specific confidence information,
the processing unit includes a vehicle control section that decides a vehicle control method in accordance with the area-specific confidence information,
the vehicle control section of the processing unit decides a vehicle control method in accordance with the area-specific confidence information and at least one of the road curvature, the yaw angle and the lateral position,
the area-specific confidence calculation section includes:
an area determination section that divides the image into a far area and a near area on the basis of the lane recognized by the lane recognition section;
an area confidence calculation section that calculates confidence for each area divided by the area determination section on a basis of the image acquired and outputs the calculated confidence as the area-specific confidence information; and
an area confidence correction section that corrects the area-specific confidence information on a basis of external information input, and
when each of the far area and the near area has the area-specific confidence information of a predetermined threshold or more, the vehicle control section decides a vehicle control method in a curve control mode, and when the far area has the area-specific confidence information less than a predetermined threshold and the near area has the area-specific confidence information of a predetermined threshold or more, the vehicle control section decides a vehicle control method in a straight control mode.

2. The vehicle controller according to claim 1, wherein
the external information used by the area confidence correction section comprises at least one of detected vehicle-speed information, acceleration information, steering-angle information, yaw rate information, obstacle information, map information and vehicle position information.

3. The vehicle controller according to claim 1, wherein
when the area determination section divides the image into four areas of left near, left far, right near and right far of a vehicle driving lane, and when a near area including the left near or the right near has the area-specific confidence information of a predetermined near threshold or more and when a far area including the left far or the right far has the area-specific confidence information of a predetermined far threshold or more, the vehicle control section of the processing unit calculates a target path using estimated curvature of the recognized lane and decides a vehicle control method in a curve control mode performing vehicle control along the calculated target path.

4. The vehicle controller according to claim 1, wherein
when the area determination section divides the image into four areas of left near, left far, right near and right far of a vehicle driving lane, and when a near area including the left near or the right near has the area-specific confidence information of a predetermined near threshold or more and when a far area including the left far or the right far has the area-specific confidence information less than a predetermined far threshold, the vehicle control section of the processing unit calculates an intra-lane target path assuming a straight line and decides a vehicle control method in a straight control mode performing vehicle control along the calculated intra-lane target path.

5. The vehicle controller according to claim 1, wherein when the area determination section divides the image into four areas of left near, left far, right near and right far of a vehicle driving lane, and when a near area including the left near or the right near has the area-specific confidence information less than a predetermined first near threshold and a second near threshold or more and when a far area including the left far or the right far has the area-specific confidence information less than a predetermined far threshold, the vehicle control section of the processing unit decides a vehicle control method in a warning mode displaying departure warning.

6. The vehicle controller according to claim 1, wherein when the area determination section divides the image into four areas of left near, left far, right near and right far of a vehicle driving lane, and when a near area including the left near or the right near has the area-specific confidence information less than a predetermined first near threshold and less than a second near threshold and when a far area including the left far or the right far has the area-specific confidence information less than a predetermined far threshold, the vehicle control section of the processing unit decides a vehicle control method in a stop mode where a signal is output to stop vehicle control using a lane recognition result or waning.

\* \* \* \* \*